United States Patent [19]

Minowa et al.

[11] Patent Number: 5,709,629
[45] Date of Patent: Jan. 20, 1998

[54] METHOD AND APPARATUS FOR CONTROLLING AUTOMATIC TRANSMISSION OF A MOTOR VEHICLE

[75] Inventors: Toshimichi Minowa, Mito; Yoshiyuki Yoshida, Hitachi; Kenichirou Kurata, Hitachinaka; Tatsuya Ochi, Hitachi, all of Japan

[73] Assignee: Hitachi, Ltd., Japan

[21] Appl. No.: 630,246

[22] Filed: Apr. 11, 1996

[30] Foreign Application Priority Data

Apr. 10, 1995 [JP] Japan .................... 7-083633

[51] Int. Cl.$^6$ .................... F16H 5/66; B60K 41/18
[52] U.S. Cl. .................... 477/120; 477/61; 477/110
[58] Field of Search .................... 477/54, 61, 102, 477/107, 110, 120, 904

[56] References Cited

U.S. PATENT DOCUMENTS

| | | | |
|---|---|---|---|
| 4,224,842 | 9/1980 | Rabus et al. | 477/120 |
| 4,724,723 | 2/1988 | Lockhart et al. | 477/110 |
| 4,798,105 | 1/1989 | Takase et al. | 477/120 |
| 4,947,329 | 8/1990 | Benford et al. | 477/61 |
| 5,094,125 | 3/1992 | Bota | 477/102 |
| 5,109,967 | 5/1992 | Saitou et al. | 477/120 |
| 5,131,295 | 7/1992 | Kodama | 477/120 |
| 5,193,060 | 3/1993 | Leising et al. | 477/120 |
| 5,211,680 | 5/1993 | Sumimoto et al. | 477/102 |
| 5,292,288 | 3/1994 | Kashiwabara et al. | 477/61 |
| 5,304,102 | 4/1994 | Narita et al. | 477/120 |
| 5,319,555 | 6/1994 | Iwaki et al. | 477/120 |
| 5,580,331 | 12/1996 | Shiraishi et al. | 477/54 |

FOREIGN PATENT DOCUMENTS

| | | |
|---|---|---|
| 63-254256 | 10/1988 | Japan . |
| 6-14040 | 4/1994 | Japan . |
| 7-59904 | 6/1995 | Japan . |

*Primary Examiner*—Dirk Wright
*Attorney, Agent, or Firm*—Evenson, McKeown, Edwards & Lenahan, P.L.L.C.

[57] ABSTRACT

A signal detector is located before an automatic transmission for detecting timing such that torque outputted from a torque converter of the automatic transmission at the moment of upshifting changes from clutch before shift to clutch after shift. A signal detector is located after the automatic transmission for detecting timing such that torque outputted from a torque converter of said automatic transmission at the moment of downshifting changes from clutch before shift to clutch after shift. An apparatus executes the driving shaft torque control in response to the changes in both torque signal detectors.

19 Claims, 20 Drawing Sheets

METHOD AND APPARATUS FOR CONTROLLING AUTOMATIC TRANSMISSION OF A MOTOR VEHICLE

BACKGROUND AND SUMMARY OF THE INVENTION

The present invention relates to method and apparatus for controlling an automatic transmission of a motor vehicle comprising a torque converter and a step automatic transmission mechanism (gears and clutches etc.). The invention relates, more particularly, to a method and apparatus which reduces the torque change (transmission gear-shifting shock) that occurs at the moment of gear-shifting of the automatic transmission.

Japanese Patent Laid-Open No. Sho 63-154156 (1988) describes a control, in which engine power is compensatingly controlled for reducing gear-shift shock, by assuming that the automatic transmission mechanism starts its gear change when the revolution of the input shaft of the transmission reaches a predetermined revolution; Japanese Patent Laid-Open No. Sho 64-4544 (1989) describes a control, in which engine power is compensatingly controlled by determining the actual timing of start and end of gear change based on the ratio between the revolutions of the input shaft of the transmission and the revolutions of the output shaft of the transmission, i.e., the ratio of gear change.

However, when detecting the start of compensatory control engine power at the moment of gear change based on the ratio of gear change of the automatic transmission mechanism, as is described in Japanese Patent Laid-Open No. Sho 64-4544, the changes in the ratio of gear change do not significantly occur for shifting up in which the ratio of gear change is changed from large to small. Thus, the detection of the timing that the torque output from a torque converter changes from clutch before gear change (low geared) to clutch after gear change (high geared) is difficult. Therefore the recognition of the start of driving shaft torque control has been greatly delayed. In addition, for downshifting, the detection of the timing that the torque output from a torque converter changes from clutch before gear change (low geared) to clutch after gear change (high geared) is not available. Therefore there have been problems that the start of the compensatory control of the driving shaft torque has to be recognized by determining the relation between the above timing of changing clutch and the transmission gear ratio from experiences.

An object of the invention is to provide an apparatus and method for controlling an automatic transmission by detecting the timing of change of the above torque transfer with precision and eliminating matching to determine the start timing of control of the engine power, the transmission fluid pressure and so on, so as to reduce the torque of driving shaft at the time of gear change (shift shock).

The above purpose may be achieved with an automatic transmission having a clutch for changing gear ratio, detecting apparatus for detecting the revolutions of an output shaft of the automatic transmission, apparatus for determining the change ratio of revolutions from that detected revolutions, and apparatus for estimating the connection of the clutch in accordance with that determined ratio of change.

In accordance with the present invention in case of gear upshifting, the moment at which the revolutions of the output shaft of the torque converter starts changing by gear shift, i.e., from the clutch associated with torque transfer before gear change to the clutch associated with torque transfer after gear change (the beginning of inertia phase) may be accurately detected for precise recognition of the start of said compensatory control of driving shaft torque. Also in case of gear downshifting, the moment at which the clutch associated with torque transfer before gear change (high geared side) is changed to the clutch associated with torque transfer after gear change (low geared side) (i.e., actual termination of gear change) may be accurately detected for precise recognition of the start of said compensatory control of driving shaft torque. Thus, for gear upshifting, the moment of changing the clutch may be accurately detected based on the information such as rate of change in the revolution and torque before transmission mechanism (such as planetary gears, and clutch), while for gear downshifting, the moment of changing the clutch may be accurately detected based on the information such as rate of change in the revolutions and torque after said transmission mechanism.

Accordingly, the compensatory control of the driving shaft torque may be performed at the precise time so as to reduce the shock of gear change.

DETAILED DESCRIPTION OF THE PREFERRED EMBODIMENTS

Figure 1:
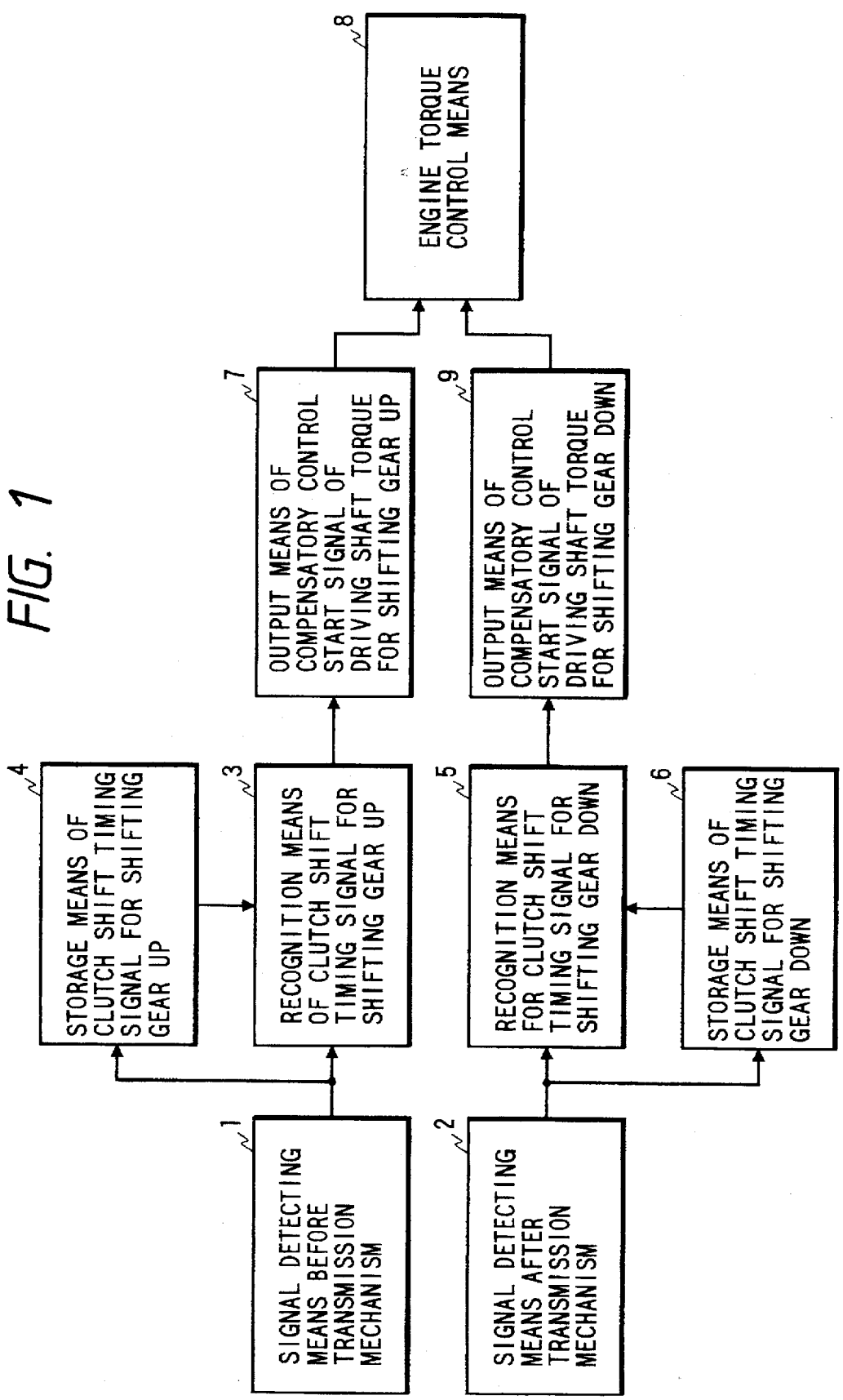
FIG. 1 is a block diagram of one of the preferred embodiments according to the present invention.

With reference to FIG. 1, when gear upshifting (i.e. changing gear from lower gear to higher gear), the moment at which torque output from the torque converter is changed from the clutch before gear change to the clutch after gear change may be detected by using a signal before or upstream in the direction of power flux of the transmission mechanism of the automatic transmission. Also, when gear downshifting (i.e. changing from higher to lower gear), the moment at which torque output from the torque converter is changed from the clutch before gear change to the clutch after gear change may be detected by using a signal after or downstream of the transmission mechanism of the automatic transmission as described in greater detail in reference to FIGS. 4 and 5. Thus, by using such signal detection, engine torque control at the time of gear shift may be achieved accurately, and without experimental or trial-and-error matching for each shift and unnecessary labor. In the present invention, the signal detector for gear upshifting is referred to as signal-before-transmission detector 1a, as well as the signal detector for gear downshifting is referred to as the signal-after-transmission 1b. The signal from the detector 1aa is sent to recognition apparatus 3 for clutch shift timing signal for gear upshifting and to storage apparatus 4 for clutch shift timing signal for gear upshifting, and the signal from the detector 1b is sent to recognition apparatus 5 for clutch shift timing signal for gear downshifting and to storage apparatus 6 for clutch shift timing signal for gear downshifting. The recognition apparatus 3 and recognition apparatus 5 compare signals currently detected by the detectors 1a and 1b with the stored value in the storage apparatus 4 and 6 to determine whether or not the clutch shift timing has been reached. If the recognition apparatus 3 judges that the signal is greater than the stored value, then the output apparatus 7 of the compensatory control start signal of driving shaft torque for gear upshifting will output such control start signal as flags to cause the engine torque control 8 to begin controlling the engine torque. If the recognition apparatus 5 judges that the signal becomes greater than the stored value, then output apparatus 9 of compensatory control start signal of driving shaft torque for gear downshifting will output such control start signal as flags to cause the engine torque control 8 to begin controlling the engine torque.

Figure 2:
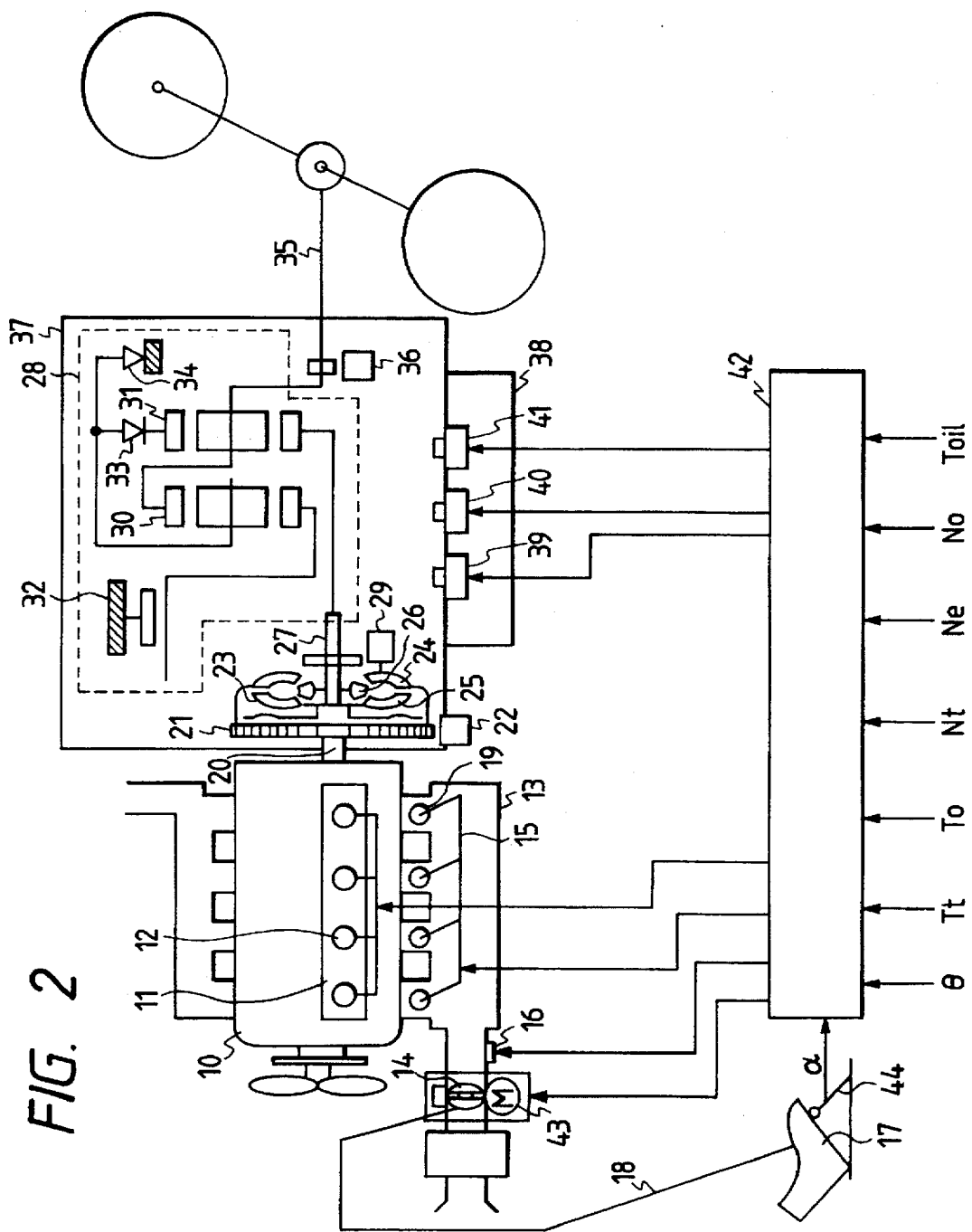
FIG. 2 is a schematic overview of the engine and the automatic transmission environment.

In FIG. 2, engine 10 in is a four cylinder engine and is provided with an igniter device 11. The igniter device 11 has four ignition plugs 12 corresponding to the number of cylinders of the engine 10. An intake manifold 13 for aspirating air into the engine 10 is provided with a throttle valve 14 for adjusting the air-flow therethrough, a fuel injection device 15 for injecting fuels therein, and an ISC valve (Idle Speed Control) 16 for controlling the air-flow to be supplied to the engine 10 during idling. The throttle valve 14 is connected to an acceleration pedal 17 with a wire 18 so as to be able to vary the opening angle of that valve linearly with the amount of operation of the acceleration pedal 17. The fuel injector 15 has four fuel injection jets 19 corresponding to the number of cylinders in the engine 10.

A fly wheel 21 is mounted onto a crank shaft 20 of the engine 10. A revolution sensor 22 for detecting the revolution of the crank shaft 20, i.e., the engine revolution Ne, is attached to the fly wheel 21. This fly wheel 21 and a torque converter 23 are comprised of a pump 24, a turbine 25, and a stator 26. The turbine 25 is connected with a torque converter output shaft 27. Power of the engine 10 is distributed from the crank shaft 20 and the pump 24 to the turbine 25 and the output shaft 27 of the torque converter 23 through a torque converter oil. The stator 26 make the torque converter oil flow from the turbine 25 to the pump 24. The output axis of the turbine 25, that is, the output shaft of the torque converter 27 is directly connected to a stepped transmission mechanism 28. A turbine revolution sensor 29 for measuring the revolution of turbine Nt is mounted onto the torque converter output shaft 27. The stepped transmission 28 is comprised of such members as planetary gears 30 and 31, band brake 32, and clutches 33 and 34. The planetary gear 31 is directly connected to a propeller shaft 35. Between the planetary gear 31 and the propeller shaft 35 a revolution sensor 36 of the transmission output shaft for detecting the revolution of the output shaft of the transmission mechanism is mounted, which is also used for the calculation of vehicle speed. An automatic transmission 37 is provided with hydraulic circuit 38 for controlling clutches and hydraulic pressure of the band brake 32 and the like. The hydraulic circuit 38 comprises hydraulic control valve 39 for controlling hydraulic pressure within the transmission, a lock-up control valve 40 for controlling the direct connection of the torque converter 23 (that is, the lock-up control), and a shift control valve 41 for controlling shift position, and so on.

Actuators for driving the engine 10 and the automatic transmission 37 as mentioned just above are controlled by a drive controller 42. Such parameters as throttle opening angle $\theta$, turbine revolution Nt, engine revolution Ne, transmission output revolution No, transmission lubricant temperature Toil detected by sensors 2a to 2g are input to the controller 42 for engine control. In other types of systems, a turbine torque Tt detected by using a torque sensor 2b mounted at the torque converter output shaft 27 and transmission output torque To detected by using another torque sensor 2c mounted at the propeller shaft 35 are also supplied to the drive controller 42.

A device which may independently control the amount of air in response to the amount of operation of the acceleration pedal 17 (for example, an electronic control throttle 43 which is not mechanically linked to the acceleration pedal) is further provided. Such engine is advantageous for changing the engine torque widely or for preventing undesirable exhaust characteristics the air-flow may be controllable with a signal from the controller 42. In this case, a throttle position sensor 44 is required to be attached to the acceleration pedal 17 to enter the driver's intention (requested torque) to the drive controller 42.

Figure 3:
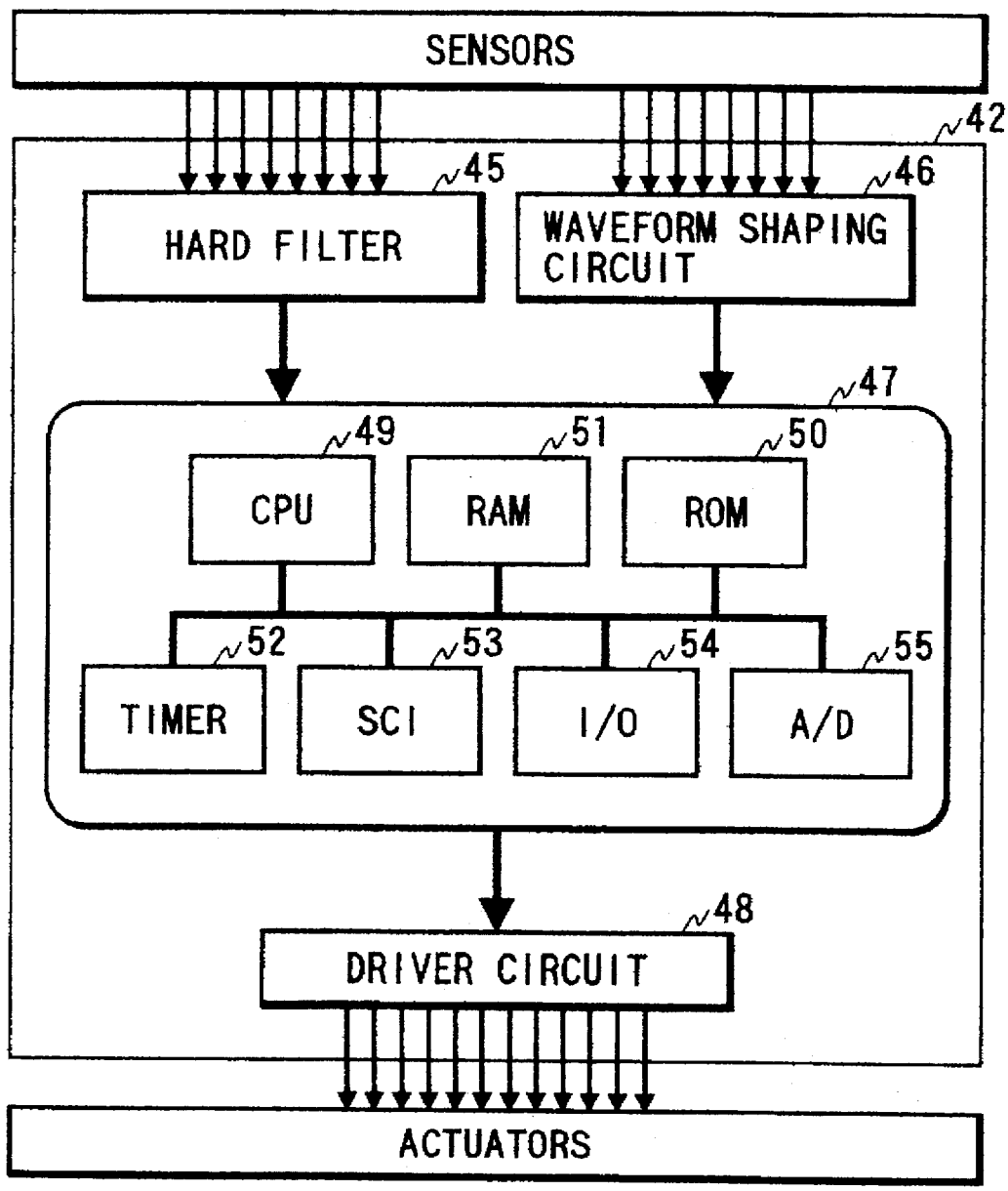
FIG. 3 is a schematic diagram of the drive controller hardware.

FIG. 3 is a schematic diagram of the hardware of the drive controller 42 comprised of a filter 45 and waveform shaping circuit 46 to both of which signals from variety of sensors 1c are input, a single-chip microcomputer 47, and a driver circuit 48 for outputting drive control signal to actuators 8b for different valves. The microcomputer 47 is comprised of a CPU 49 for executing a variety of operations, a ROM 50 for storing programs and data for use by the CPU 49, a RAM 51 for temporarily storing a variety of data, a timer 52, a SCI (Serial Communication Interface) circuit 53, input/output (I/O) circuit 54 and analog-to-digital (A/D) converter 55. That is, various functions of the controller 42 may be achieved by using CPU 49 to execute predetermined operations with programs and data stored in the ROM 50 and RAM 51.

As another example of the hardware of the controller 42, there may also be a single-chip architecture as described just above, an architecture in which a plurality of single-chip microcontrollers are communicated through dual-port RAMs, as well as an architecture in which a plurality of microcontrollers are communicated through a local area network (LAN).

Figure 4:
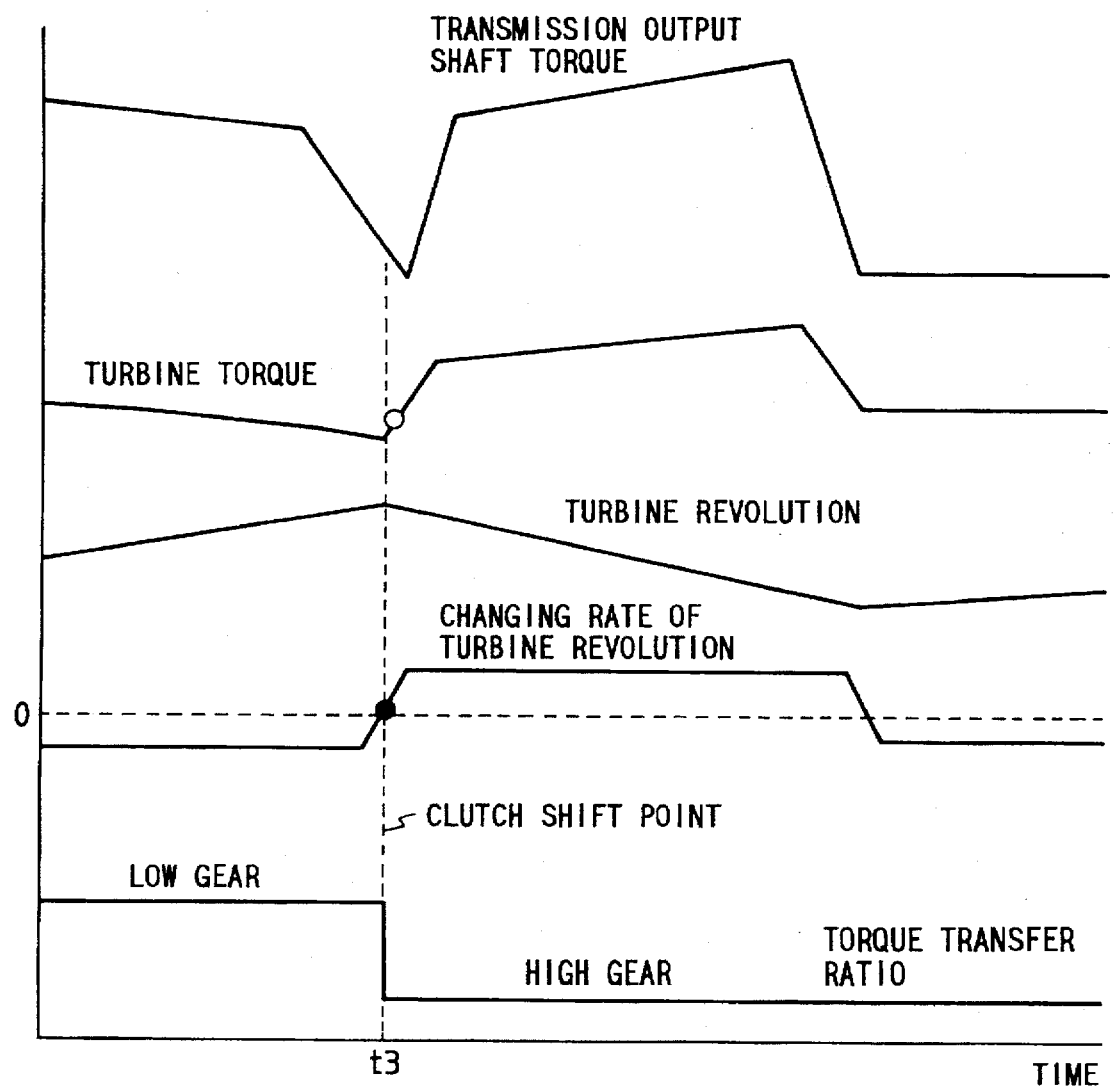
FIG. 4 is a characteristics curve for gear upshifting.
Figure 5:
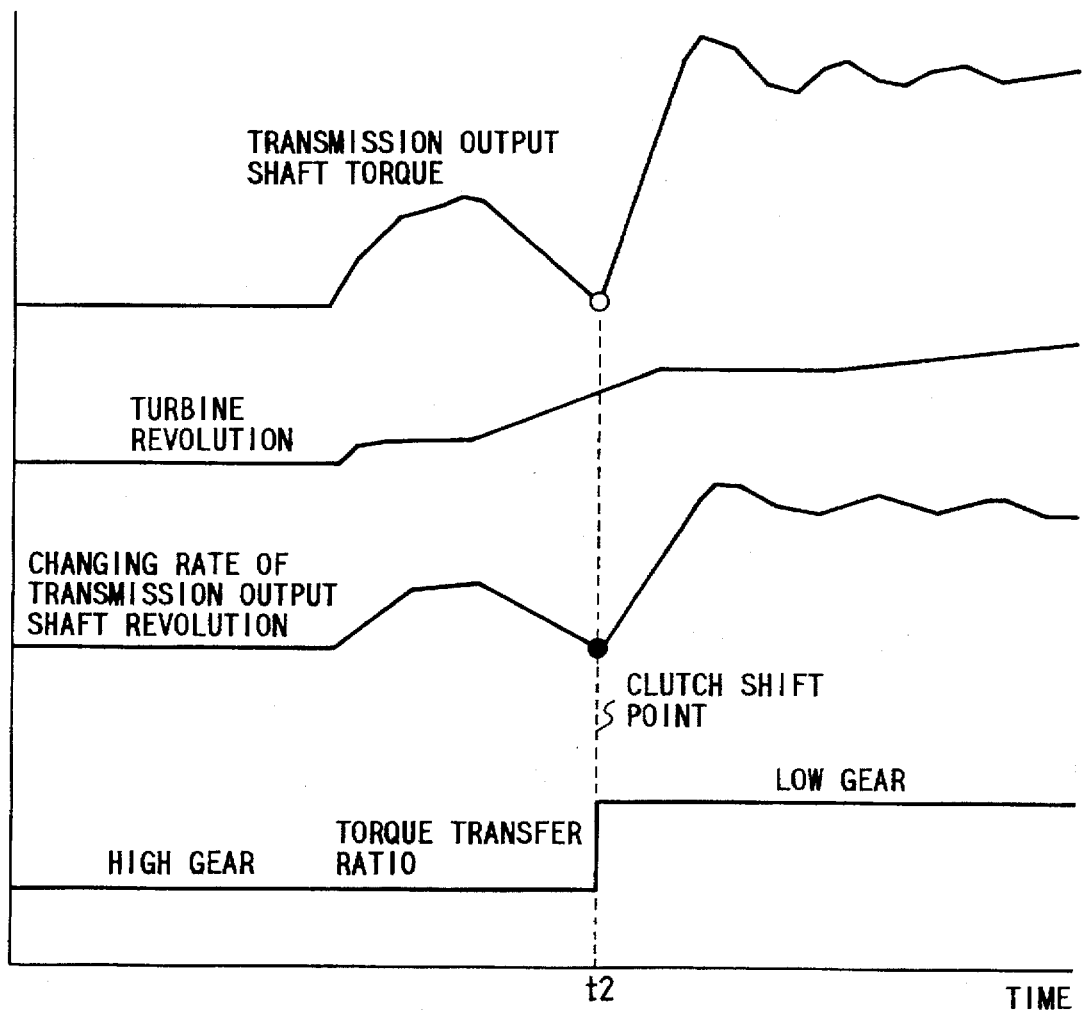
FIG. 5 is a characteristics curve for gear downshifting.

FIG. 4 shows characteristics of gear upshifting, and FIG. 5 shows characteristics of gear downshifting. In FIG. 4, when shifting up using the transmission of the automatic transmission shown in FIG. 2, the point t3 at which the turbine revolutions start to change, i.e., turbine torque starts to increase, that is, the point at which the rate of change of turbine revolutions of positive-going crosses zero point, will be the point at which torque transfer ratio changes from low-geared side to high-geared side, i.e., switches from low-geared clutch to high-geared clutch. Both of these are signals of sensors located before or upstream of the transmission mechanism 28. On the other hand, signals of sensors after or downstream of the transmission mechanism 28, which is the minimum of transfer output shaft torque signal t1, is delayed compared with the point of clutch shift before transmission. Therefore the signal before the transmission is more accurate for the purpose of detection of the point of clutch shift. However, because even in the signal before transmission, the variability may not be significant when using turbine revolution, then the changing rate of turbine revolutions and the turbine torque are required. When gear downshifting as shown in FIG. 5, the point of changing clutch cannot be detected by using the signal before the transmission mechanism, i.e., turbine revolutions. However, when using the signal after the transmission, that is, when using transmission output shaft torque and the changing rate of revolutions of the transmission output shaft, minimum value t2 may be detected.

As a result, using the signal before the transmission for the beginning of the compensatory control of driving shaft torque for gear upshifting, as well as the signal after transmission for the beginning of the compensatory control of driving shaft torque for gear downshifting allows controllability to be increased for the purpose of managing the shock of gear change, as well dispensing with the need for matching respective gear shift (shift up from low to second, second to third, shift down from second to low, etc.) so that control steps may be decreased.

Figure 6:
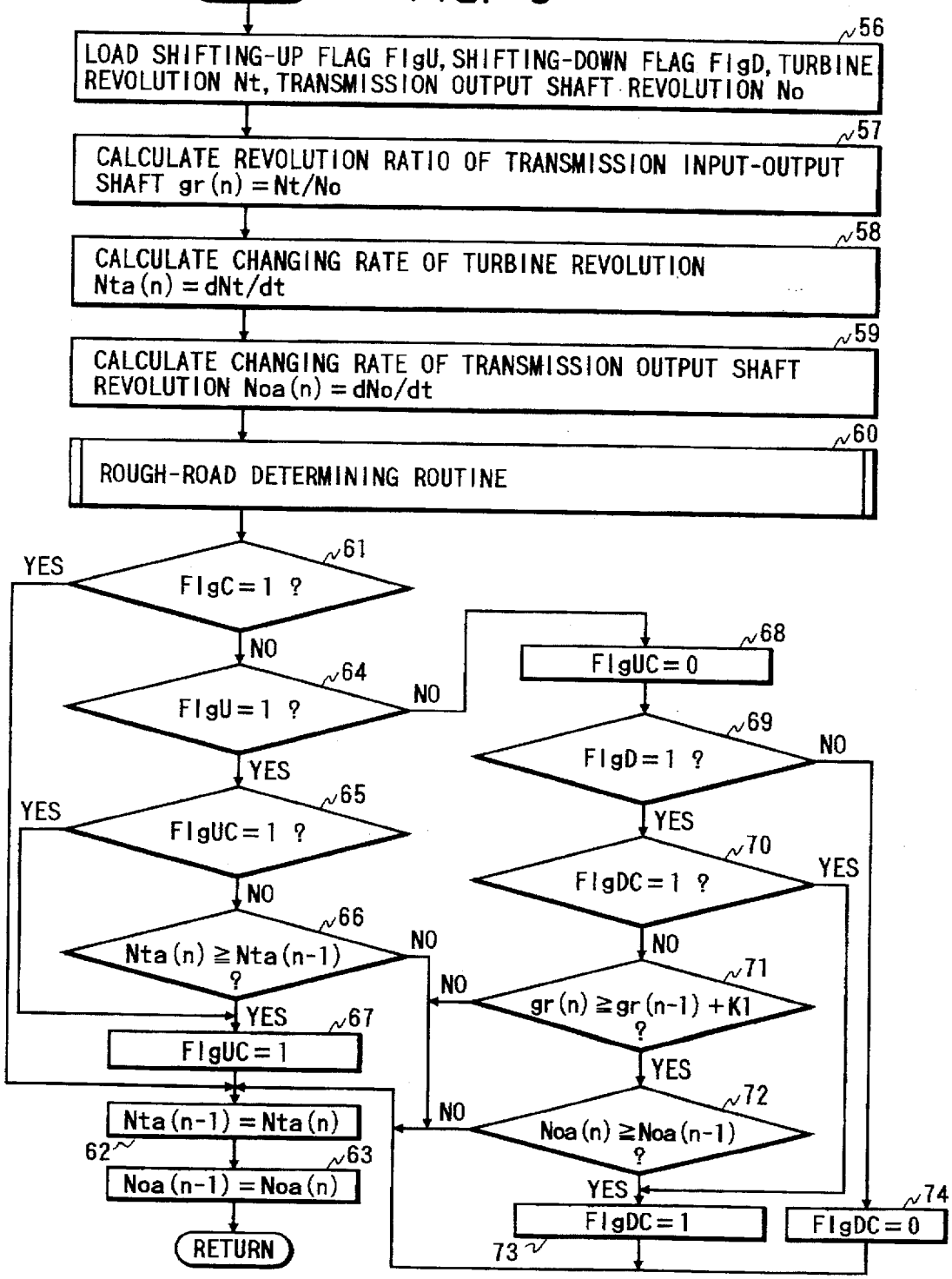
FIG. 6 is a control flowchart of one of the preferred embodiments of the present invention.

In step 56 of FIG. 6, shifting-up flag FlgU and shifting-down flag FlgD as signals determined by shift control, as well as turbine revolution Nt, transmission output shaft revolution No are loaded.

In step 57, the current revolution ratio of transmission input-output shaft gr(n) is calculated by using Nt and No.

In step 58, the current changing ratio of turbine revolution Nta(n) is determined by deriving Nt. In step 59, the current changing ratio of transmission output shaft revolution Noa(n) is determined by deriving No. In step 60, a subroutine for determining rough-road condition which may be thought to affect to the control using the changing ratio of transmission output shaft will be executed as described below. If the running condition is determined to be on rough-road, then FlgC becomes 1, and the process will proceed to step 61, 62, and 63, and return. If not, then process will proceed to step 64 to determine whether or not a shifting-up signal is issued. If yes, then the process will proceed to step 65 to further determine whether FlgUC is 1, which flag determines whether or not the compensatory control of driving shaft torque for gear upshifting is in progress. When the default value is 0, then the process will proceed to step 66. In step 66, a previous changing rate of turbine revolutions Nta(n−1) determined in step 62 is compared with Nta(n). If the result is greater, then it is determined that the shift point from low-geared clutch to high-geared clutch is reached, and the compensatory control start flag is set to 1 in step 67. Accordingly, control of engine torque will be executed, as described below. Thereafter, the steps 65 and 67 will be iteratively executed until engine torque control flag for gear upshifting FlgU becomes 0. The flag FlgU may be overwritten to 0 in the flow chart of engine torque control described later.

If no signal is issued in step 64, then the flag FlgUC is set to 0 in step 68 to proceed to step 69. In step 69, it is determined whether or not the shift-down signal is issued. If yes then the process will proceed to step 70 to determine whether or not flag FlgDC is 1, which flag determines whether or not the compensatory control of driving shaft torque for gear downshifting is in progress. As the default value is 0, the process will proceed to step 71. In step 71, it is determined whether or not the current revolution ratio of input-output shaft gr(n) is greater than the previous revolution ratio gr(n−1). This distinguishes the raise characteristics at the beginning of the downshifting signal from the characteristics of clutch shifting. If yes in step 71, then process will proceed to step 72 to compare the previous changing rate of transmission output shaft revolution Noa(n−1) with Noa(n). If the comparison results in being positive, then it is determined to be the point of shifting gear from high-geared clutch to low-geared clutch, and the compensatory control start signal FlgDC is set to 1. The engine torque control as described below will be performed in a manner similar to the case of gear upshifting, and steps 70 and 73 will be iteratively executed until the engine torque control flag for gear downshifting FlgD becomes 0. The flag FlgD will also be overwritten to 0 in the flow chart of the engine torque control described below. If 0, then the process will proceed from step 69 to step 74 to set FlgDC to 0, then proceed to steps 62 and 63 to return. In addition, by using a relationship in which torque relates to the changing rate of revolution, attaching torque sensors before and after the transmission mechanism to detect change torque between them, the moment of clutch shift may be detected.

Figure 7A:
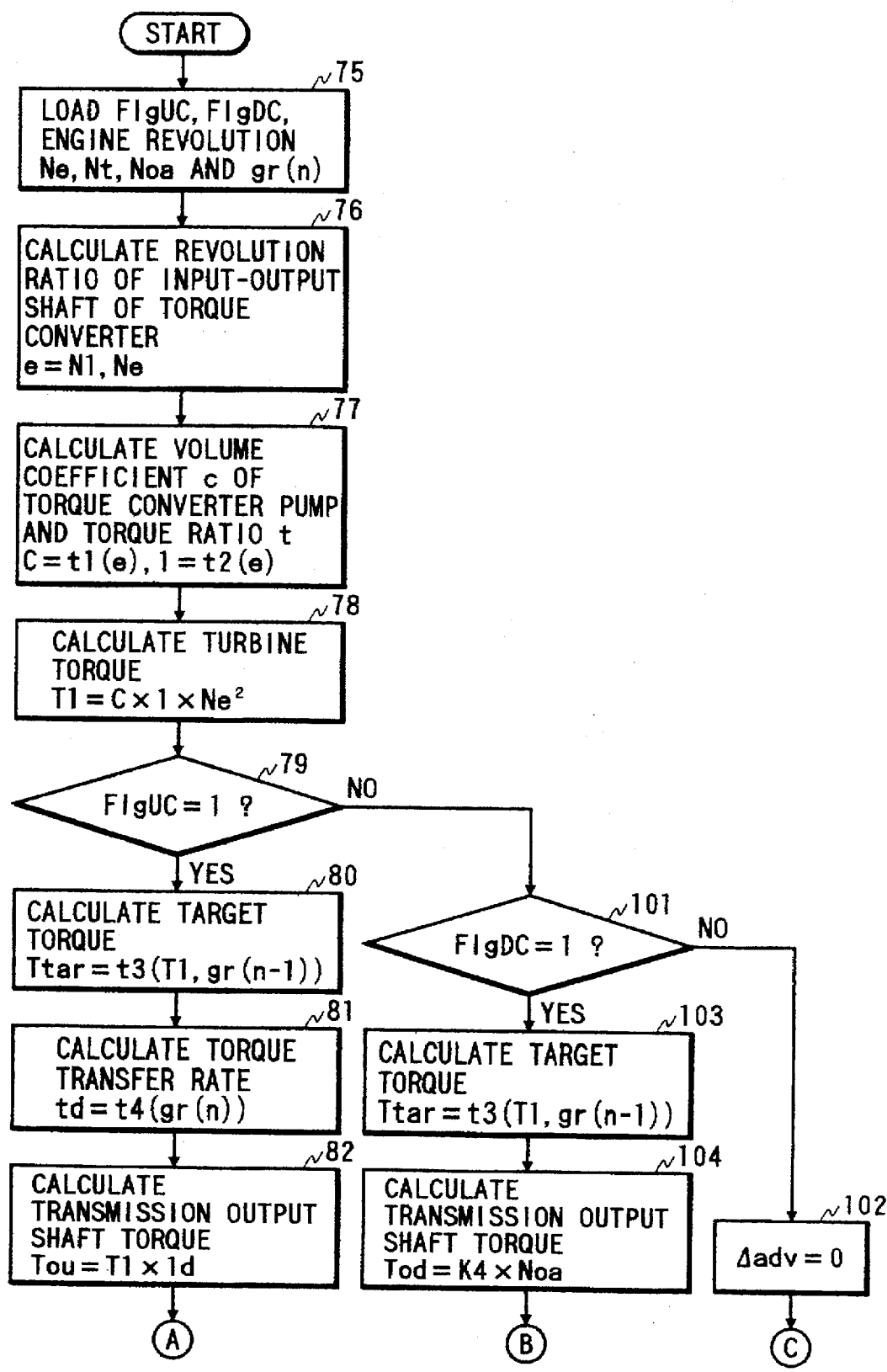
FIGS. 7a and 7b constitute a control flowchart of the compensatory control of drive shaft torque.

In FIGS. 7(a) and (b), a control flow chart of the compensatory control of driving shaft torque is shown. In step 75, the FlgUC, FlgDC, engine revolution Ne, said Nt, No, and gr(n) are loaded. In step 76, revolution ratio e of the input shaft and output shaft of the torque converter will be calculated by using Nt and Ne. In step 77, volume coefficient c of the pump of torque converter and torque ratio t will be respectively derived from respective functions f1 and f2 of the revolution ratio e (in practice, table of torque converter characteristics is retrieved in general). In step 78, said calculated c and t, as well as retrieved Ne are used for calculation of turbine torque Tt. This Tt may be a signal from torque sensor. Then, in step 79, it is determined whether or not the flag FlgUC of the compensatory control start of the driving shaft torque for gear upshifting is 1. If yes, then the process will proceed to step 80 to calculate a target torque Ttar from calculated Tt and function f3 of the previous revolution ratio of input-output shaft of the transmission gr(n−1) (revolution ratio in low-geared side). In step 81, torque transfer ratio td is calculated by using function f4 of high-geared revolution ratio using the current revolution ratio gr(n) of input-output shaft of the transmission. Next, in step 82, by using the calculated Tt and td, transmission output shaft torque Tou for gear upshifting is calculated. In step 83, it is determined whether or not the flag FlgA of torque feedback control start is 1. Since the default value is 0 the process will proceed to step 84. At the beginning of the compensatory control of driving shaft torque, control is better with a uniform decrease in engine torque than in controlling with target torque, so that timer control will be used. Thereafter torque feedback control will be performed. Steps 84 to 88 are the timer control. In step 84, it is determined if timer control period K2 has expired. If no, then 1 is added to Timer1 in step 85, and the amount of retard K3 for ignition timing is entered to compensated ignition timing Δadv in step 86. Then in step 87, ignition timing ADV is calculated, and is output in step 88. If yes, i.e., timer control is terminated in step 84, then the FlgA is set to 1 in step 80, and the timer 3 is set to 0 in step 90 to proceed to step 90. Thereafter, the process will proceed from step 83 to step 91. In step 91, the deviation ΔT between the actual transmission output shaft torque Tou and the target torque Ttar is calculated. In step 92, it is determined whether or not ΔT is less than 0. If no, the process will proceed to step 93 to calculate the compensatory ignition timing Δadv by using function f5 of the ΔT. This is the ignition timing control with torque feedback. If yes in step 92, then the process will proceed to step 94 to determine whether or not timer3 is K7. This step is performed for determining whether the driving shaft torque at the time of gear upshifting becomes smaller than the target torque, and the gear shift has been successfully terminated. If no, the timer3 is incremented in step 95 to continue the feedback control of step 93. If yes, then FlgU, FlgD, FlgA, FlgB, Δadv are respectively set to 0 in steps 96 to 100 and the process will proceed to step 87. Here ends the torque compensatory control for gear upshifting.

If no in step 79, the process will proceed to step 101 to determine whether or not torque control start flag FlgDC for shifting gear down is 1. If no, then in step 102 Δadv is set to 0 to proceed to step 87. If yes, then the process will proceed to step 103 to calculate target torque Ttar by using calculated Tt and function f3 of the previous revolution ratio of input-output shaft of the transmission gr(n−1) (revolution ratio in low-geared side). In step 104, transmission output shaft torque Tod for shifting gear down is calculated by using the changing rate of revolution in transmission output shaft Noa and the torque translation constant K4. This Tod may be the signal from torque sensor mounted to the transmission output shaft. In step 105, it is determined whether or not flag FlgB for starting torque feedback control for shifting gear down is 1. Since the default value is 0 then the process will proceed to step 106. At the beginning of the compensatory control of driving shaft torque, as the controllability is better in decreasing uniformly engine torque than in target torque control, timer control will be used. Thereafter torque feedback control will be performed. Steps 106 to 110 are timer control. In step 106, it is determined whether or not timer control period K5 has expired. If no, then in step 107, 1 is added to Timer2, a given amount of retard for ignition timing K6 is entered to the compensatory ignition timing Δadv in step 108. Thereafter, the ignition timing ADV is calculated in step 87, and is output in step 88. If yes in step 106, i.e., timer control is terminated, then the FlgB is set to 1 in step 109, the timer2 is set to 0 in step 110 to proceed to step 111. Thereafter, the process will proceed to step 111 from the step 105. In step 111, the deviation ΔT between the calculated actual transmission output shaft torque Tod and the target torque Ttar is calculated to perform torque feedback control thereafter, in a manner similar to the case of gear upshifting.

Figure 8:
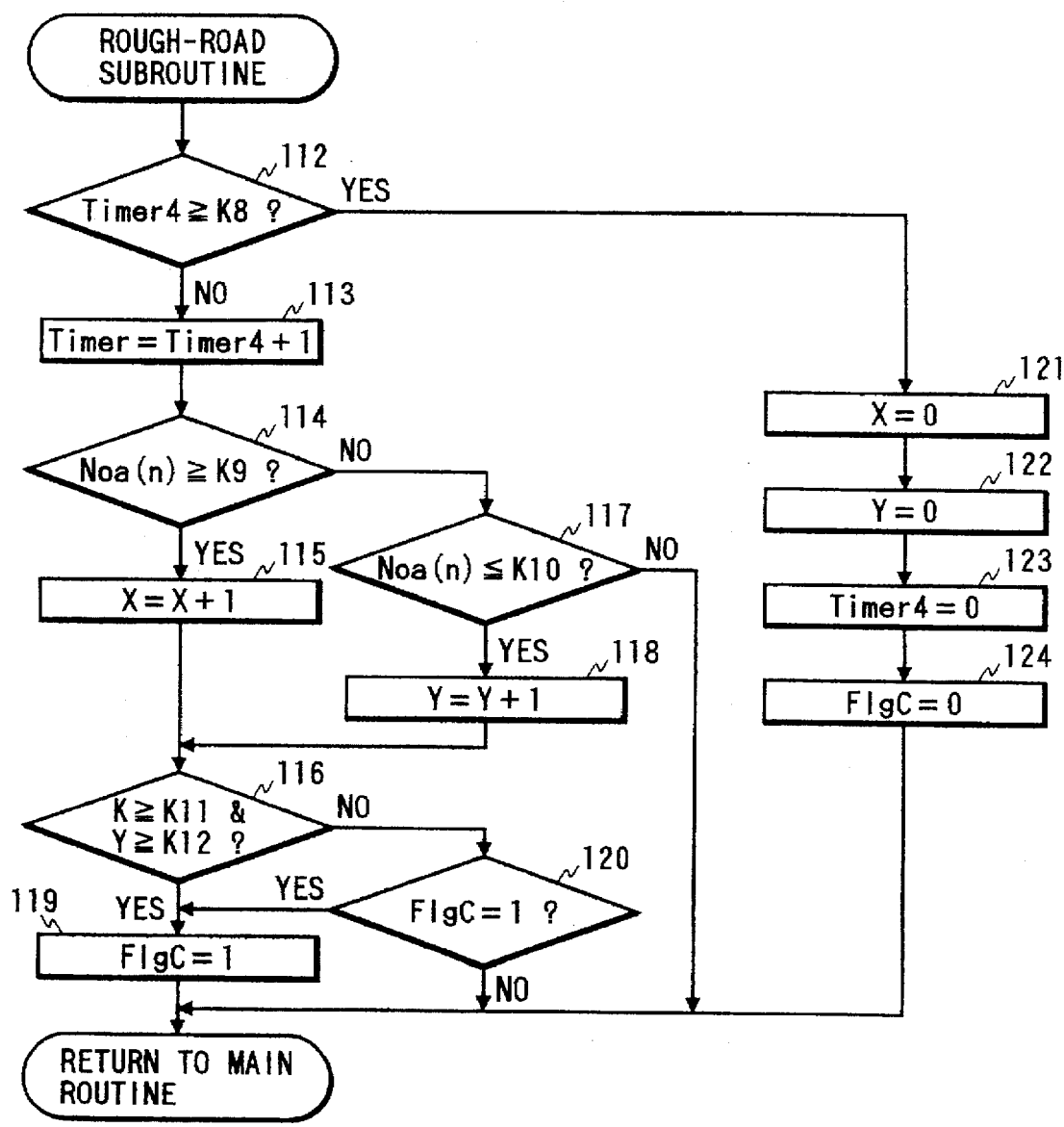
FIG. 8 is a flow chart of rough-road detection subroutine.

In step 112 of FIG. 8, it is determined whether or not timer4 is greater than the rough-road detection period K8. Since the default value is 0 then the process will proceed to step 113, where timer 4 is incremented, then to step 114. In step 114, it is determined whether or not the current changing revolution rate in the transmission output shaft Noa(n) is greater than the predetermined positive threshold K9. If yes then the process will proceed to step 115 to increment rough-road detection coefficient x to proceed to step 116. If no in step 114 then the process will proceed to step 117 to determine whether or not the current changing revolution rate in the transmission output shaft Noa(n) is less than the predetermined negative threshold K10. If yes then the process will proceed to step 118 to increment the rough-road detection coefficient y to proceed to step 116. In step 116, it is determined whether or not x and y are respectively greater than their respective threshold coefficient K11 and K12. If both are greater, then it is determined that the Noa(n) varies positively and negatively, that the road is rough. The process will proceed to step 119 to enter 1 into the rough-road detection flag FlgC to return to main routine in FIG. 6. If the road condition is not yet determined to be rough in step 116, then the process will proceed to step 120 to determine whether or not the FlgC is 1. If yes, then it is determined that the rough-road is continuing, and the process will proceed to step 119. If no, this means the determination is in progress. If yes in step 112, the rough-road detection period has expired. In this case, X, y, timer4 and FlgC are respectively set to 0 in step 121, 122, 123, and 124 to return.

Figure 9:
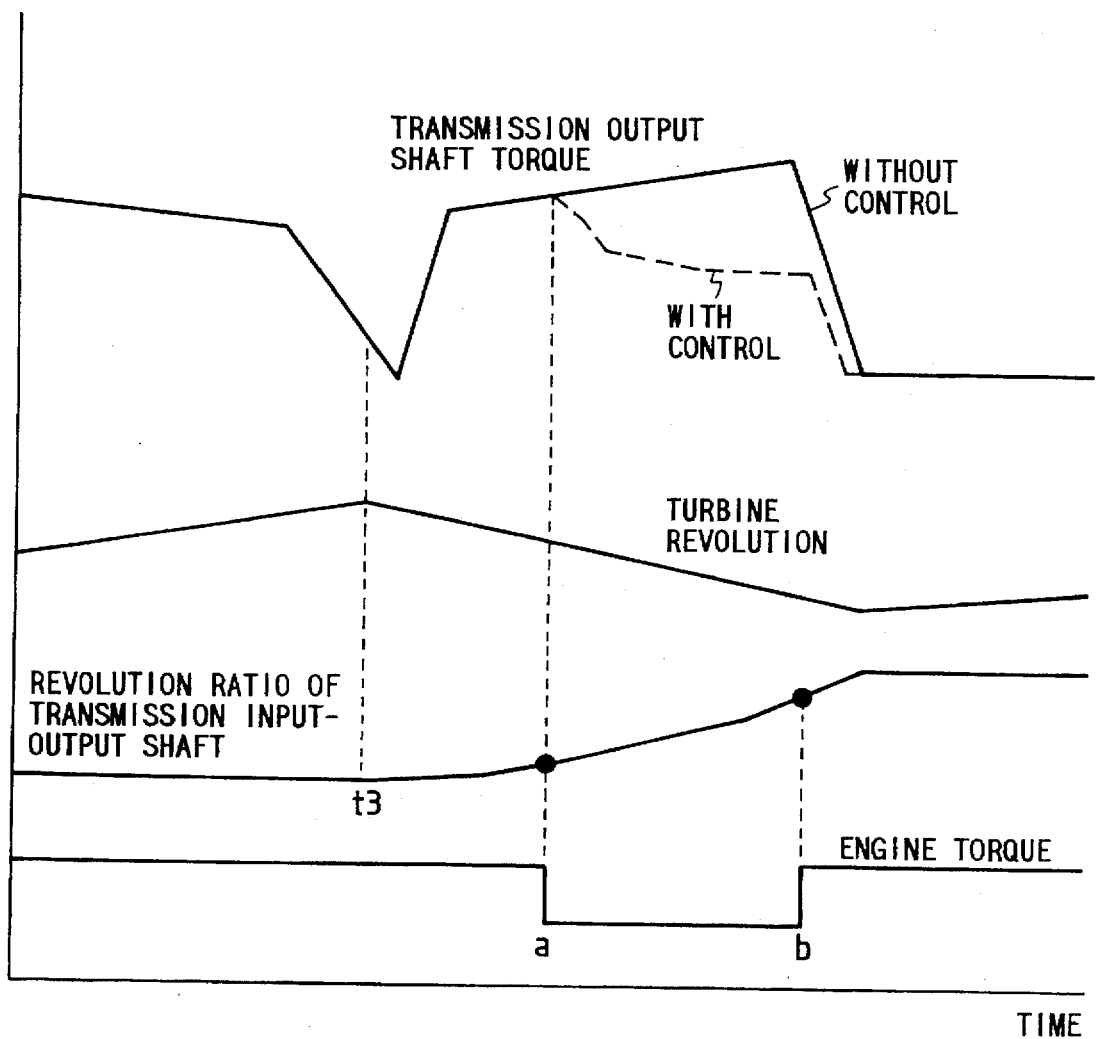
FIG. 9 is a time-based chart of conventional torque control in gear upshifting.
Figure 10:
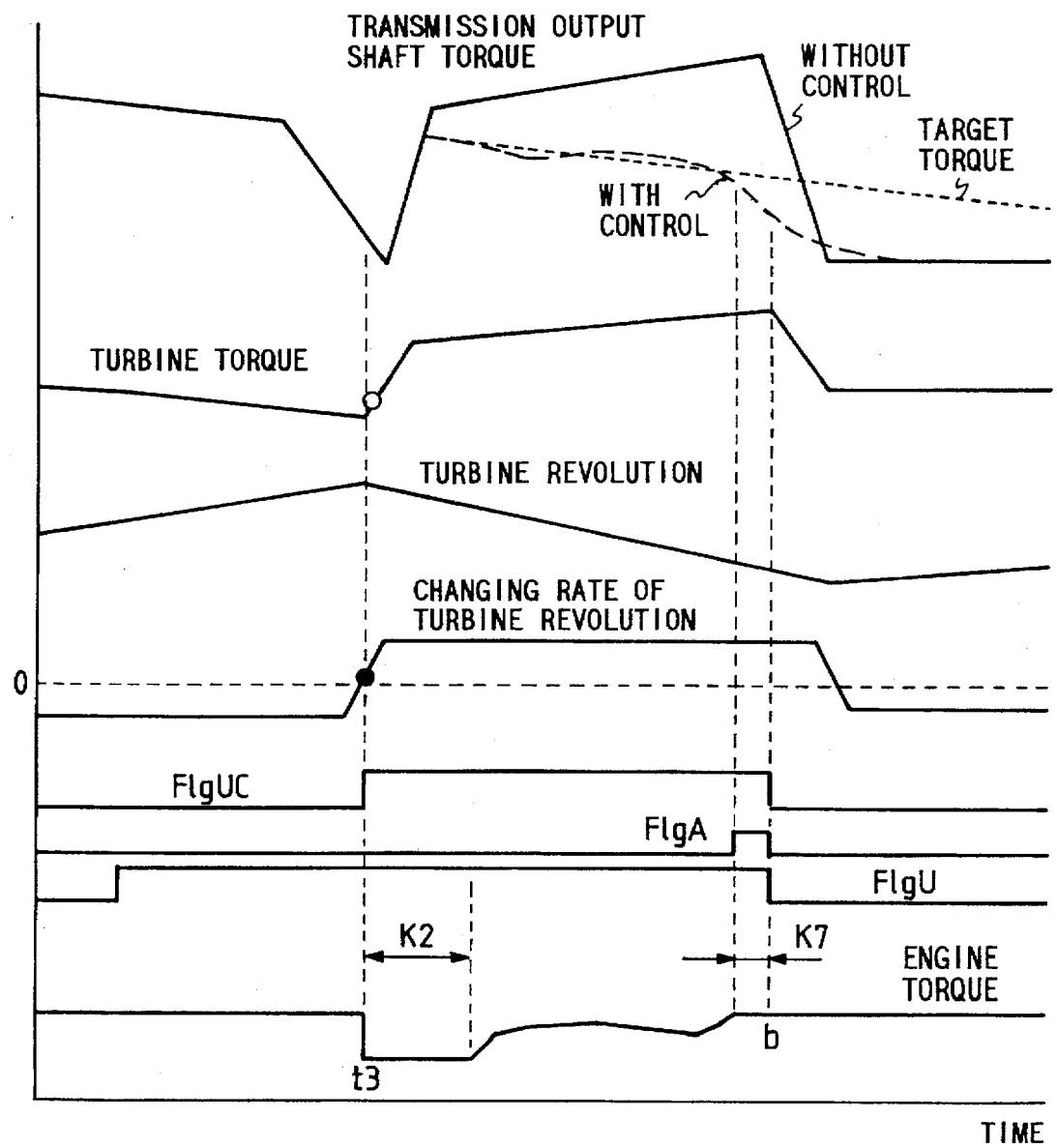
FIG. 10 is a time-based chart of torque control in gear upshifting according to the present invention.

FIG. 9 is a time-based chart of torque control in gear upshifting, while FIG. 10 is a time-based chart of torque control in gear upshifting according to the present invention. In the prior art, even though turbine revolution has been varied at the moment t3, because of the use of the revolution ratio of the input-output shaft of the transmission gr=Nt/No, a significant change in the revolution ratio is not apparent; thus, the start timing of the engine torque control is at the point shown as black dot (a). Therefore, the transmission output shaft torque Tou has been decreased in the middle of gear shift as shown by broken line, so the suppression of gear shift shock has not been sufficiently effective. In addition, the timing of determination of the termination of gear shift b has been detected by using experimental matching, for the consideration of the termination of engine torque control and the change of the transmission output shaft torque.

Figure 7B:
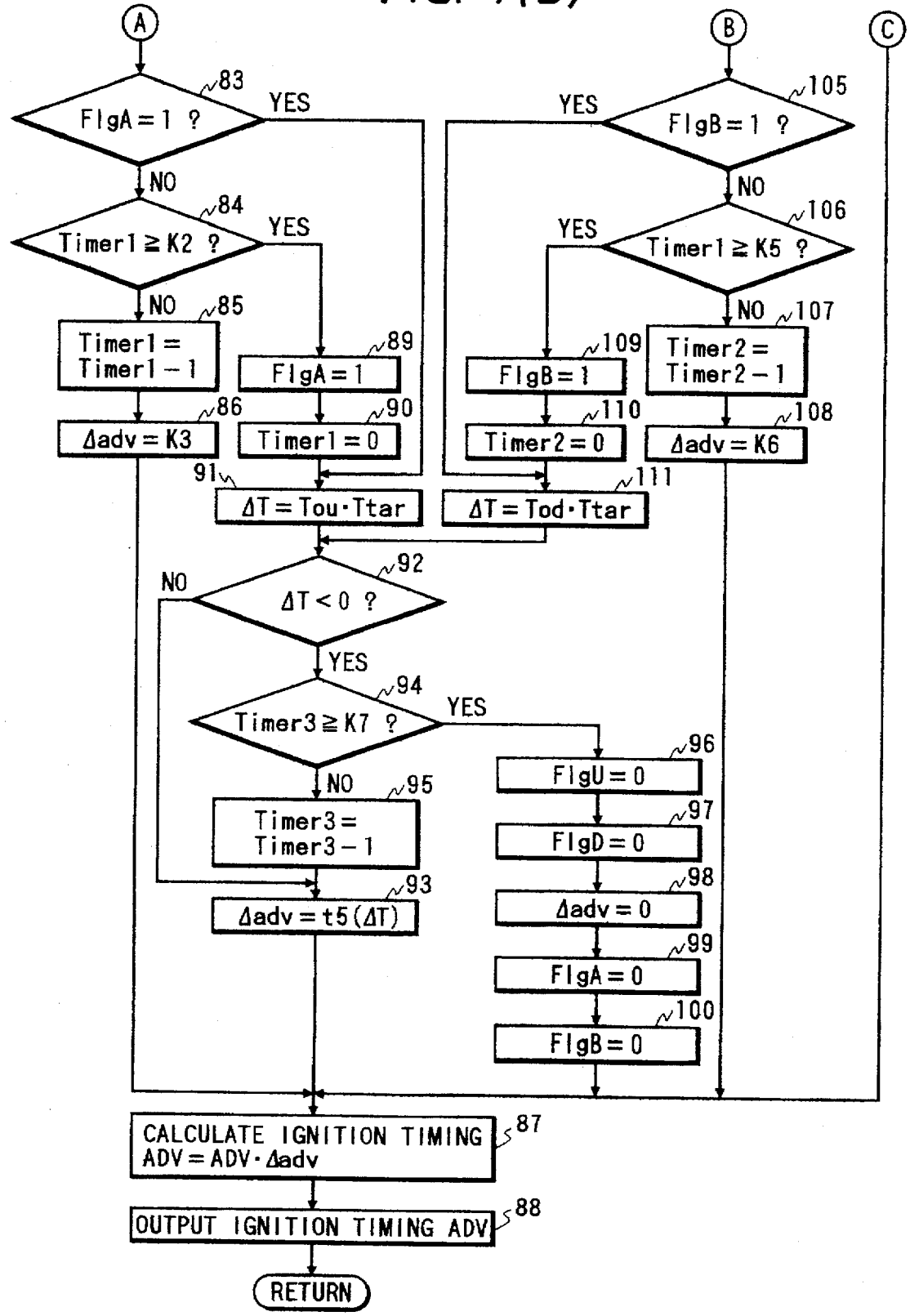

In accordance with the present invention as shown in FIG. 10, however, t3, the moment of clutch change may be reliably recognized from either turbine torque Tt or changing rate of turbine revolutions Nta. Furthermore, by performing control as shown in FIG. 6 and FIG. 7, the transmission output shaft torque Tou (broken line) changes smoothly closing the target torque Ttar. This means that the gear shift shock is sufficiently suppressed. Flags and constants shown in FIG. 6 and FIG. 7 will change as indicated in FIG. 10. Also, the target torque Ttar, which may also be used for the recognition of the termination of gear shift, is required to adjust its inclination for each shift in order to recognize the termination timing of gear shift accurately because the transmission output shaft torque Tou varies from shift to shift.

Figure 11:
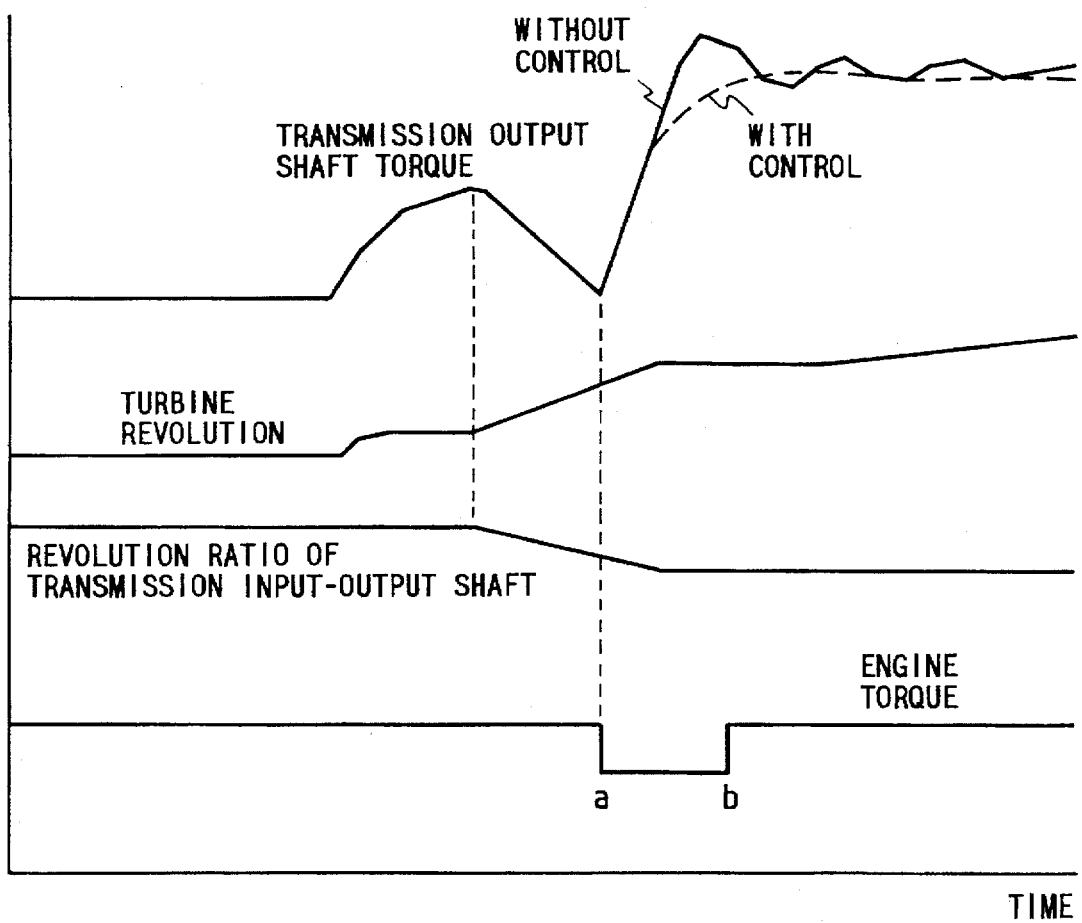
FIG. 11 is a time-based chart of conventional torque control for gear downshifting.
Figure 12:
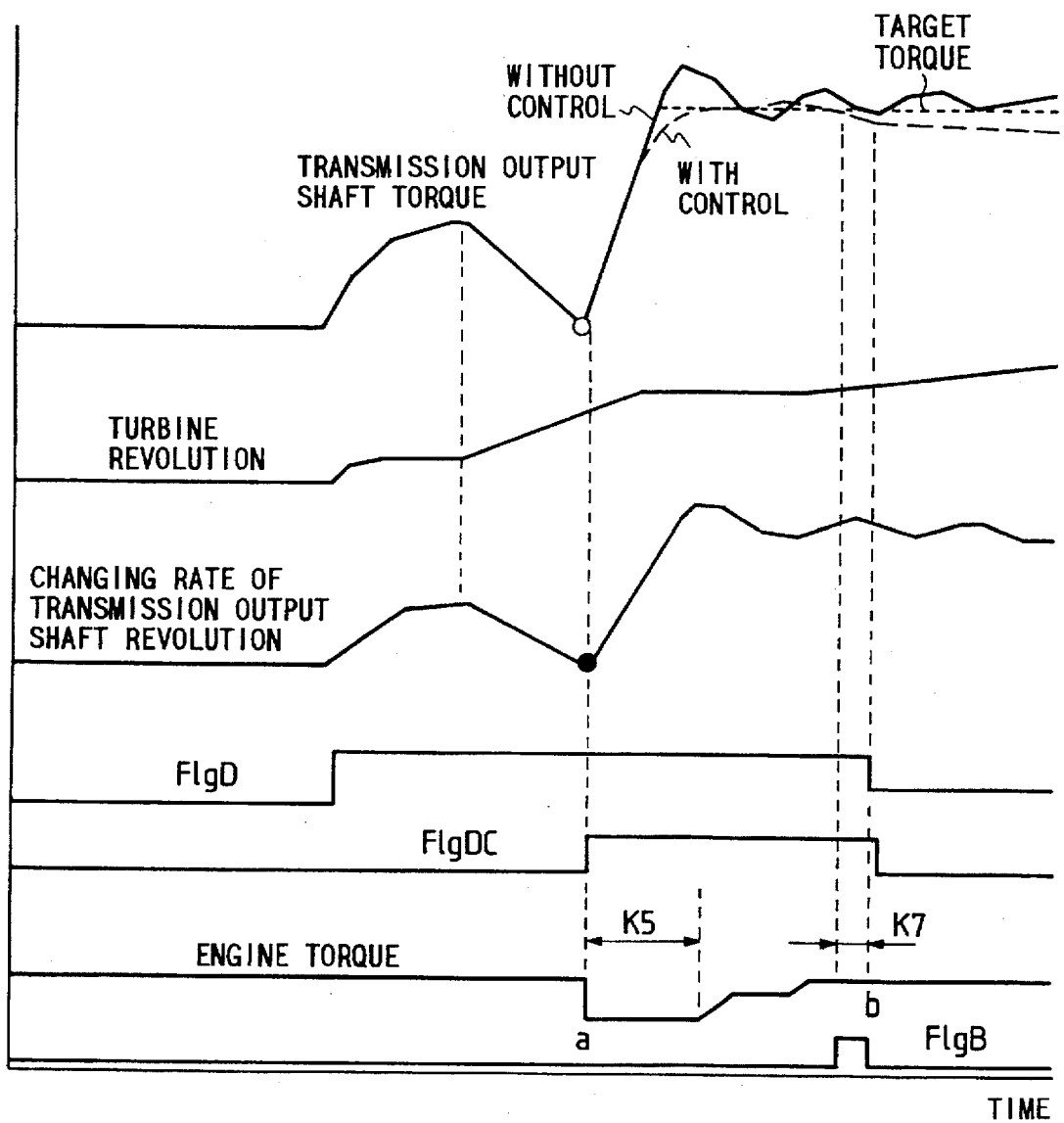
FIG. 12 is a time-based chart of torque control for gear downshifting according to the present invention.

FIG. 11 shows a time-based chart of torque control for conventional gear downshifting, and FIG. 12 shows a time-based chart of torque control for gear downshifting according to the present invention. In the conventional manner, in order to suppress the change in the transmission output shaft torque Tod after the point of clutch shift (a), the point (a) has been recognized by using the revolution ratio gr of the input-output shaft of the transmission mechanism. Based on the fact that the revolution ratio gr may be settled after clutch changes, the shift point (a) has been determined by using the relation between the moment of clutch shift and the revolution ratio from experimental matching. In addition, as matching data has to be stored for each of shifts, expanded ROM capacity is necessary.

In accordance with the present invention as shown in FIG. 12, however, the point (a), the moment of clutch change may be reliably recognized from either the transmission output shaft torque Tod or the changing revolution rate Noa of the transmission output shaft. Furthermore, by performing control as shown in FIG. 6 and FIG. 7, the transmission output shaft torque Tod (broken line) changes smoothly. This means that the gear shift shock is sufficiently suppressed. Flags and constants shown in FIG. 6 and FIG. 7 will change as indicated in FIG. 12. Also, the target torque Ttar, which may also be used for the recognition of the termination of gear shift, is required to adjust its inclination for each shift in order to recognize the termination timing of gear shifting accurately because the transmission output shaft torque varies from shift to shift.

Figure 13:
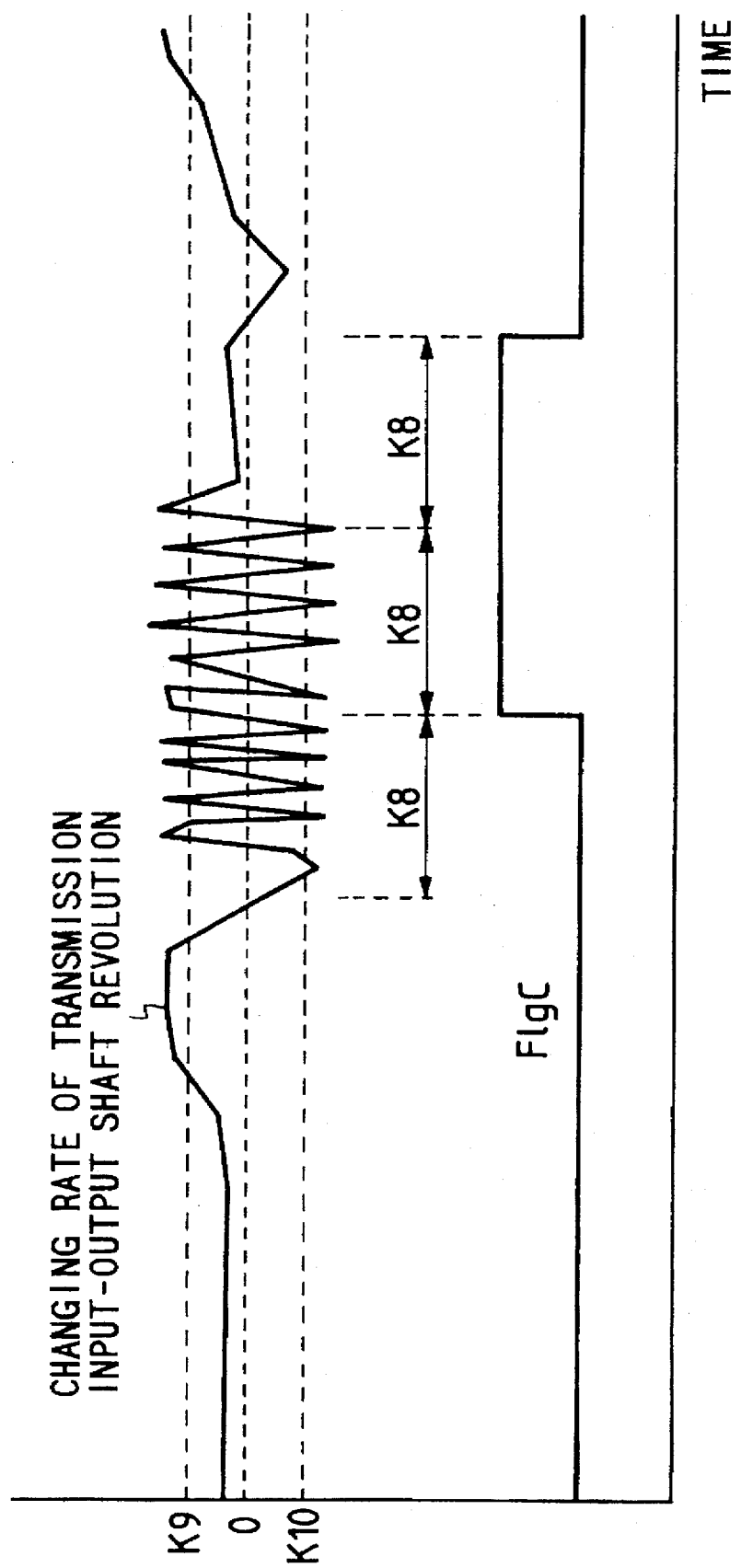
FIG. 13 is a time-based chart of detected rough-road.

FIG. 13 shows a time-based chart of detected rough-road as mentioned in FIG. 8. K9 is a positive threshold, K10 is a negative threshold. The rough-road detection flag FlgC will be set to 1, if during the rough-road detection period K8, the magnitude of the changing revolution rate Noa over K9 or K10 exceeds a predetermined number of rough-road detection. If the values becomes less than the detection constant then the rough-road detection flag FlgC is set to 0.

Figure 14:
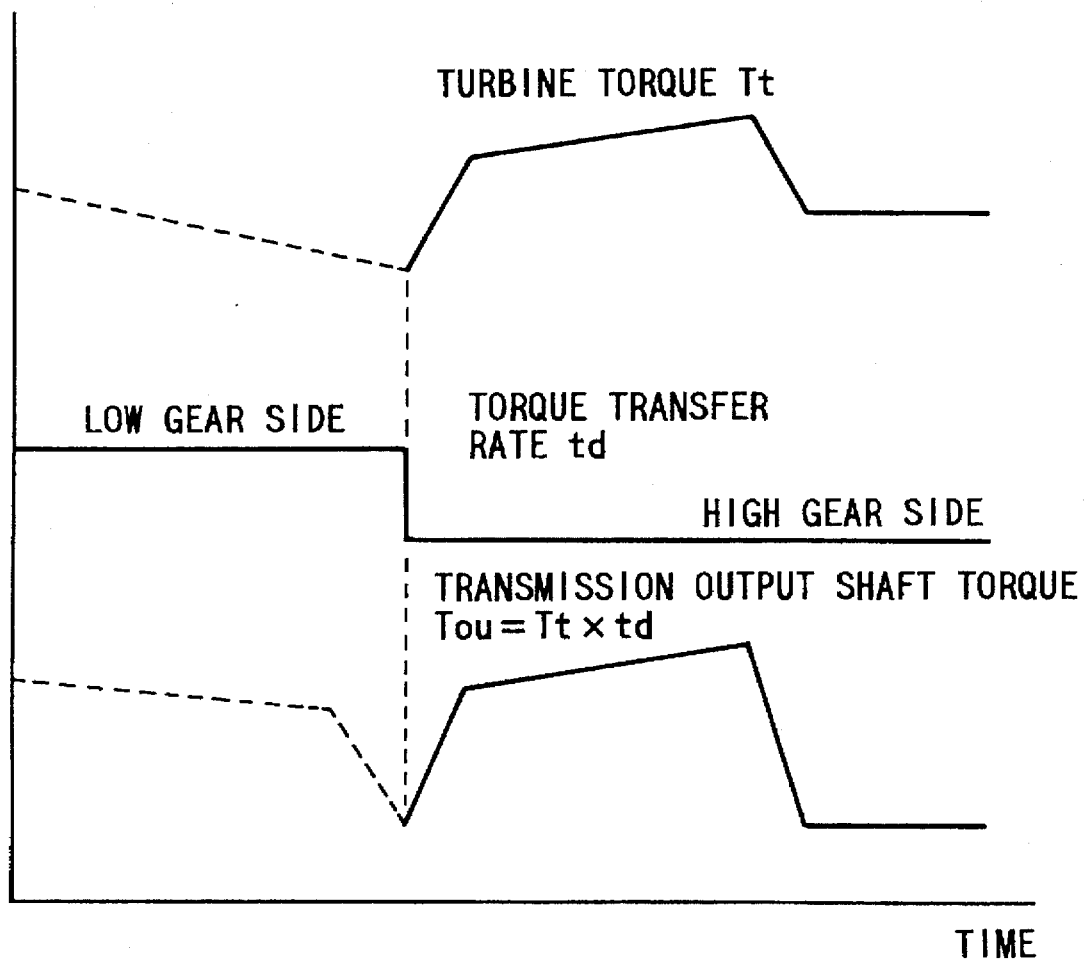
FIG. 14 is a time-based chart of estimated transmission output shaft torque for gear upshifting.
Figure 15:
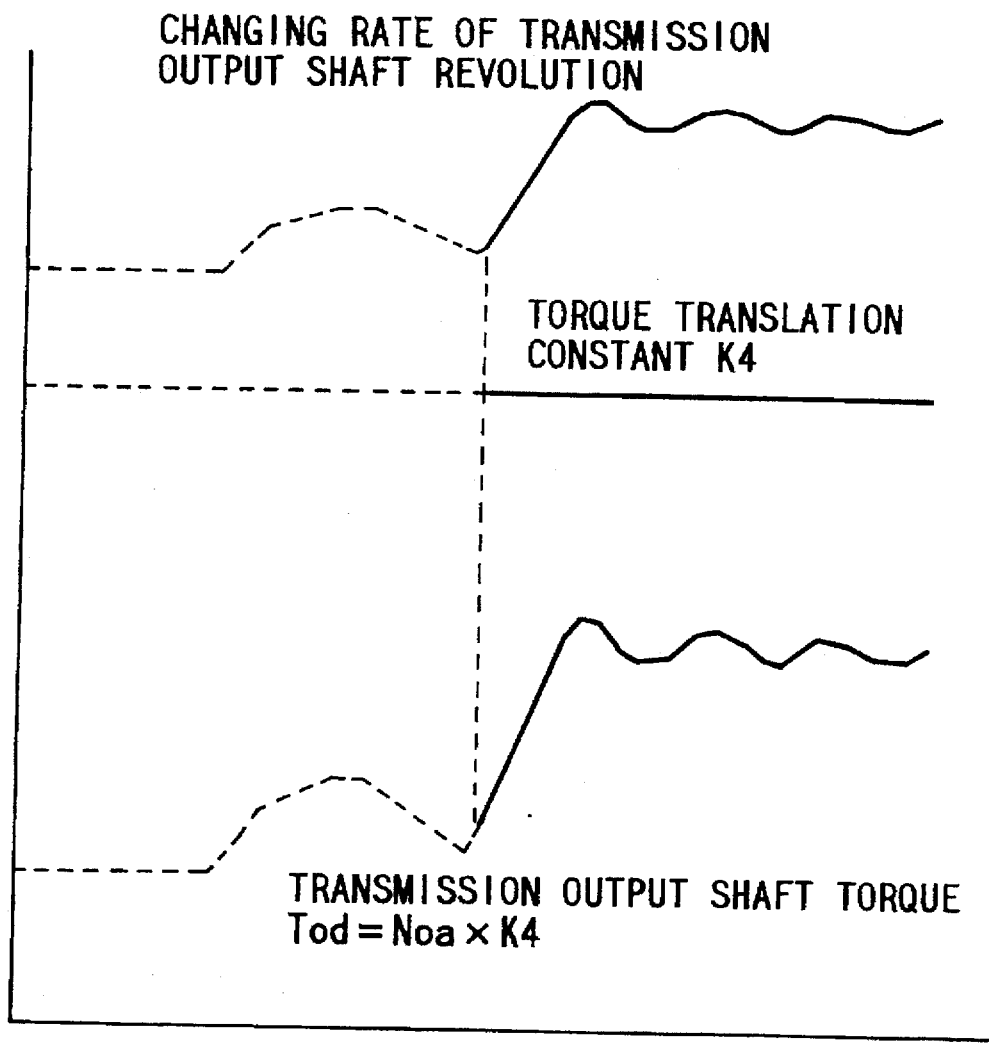
FIG. 15 is a time-based chart of estimated transmission output shaft torque for gear downshifting.

FIG. 14 is an estimated time chart of transmission output shaft torque Tou for gear upshifting, and FIG. 15 is an estimated time chart of transmission output shaft torque Tod for gear downshifting. In FIG. 14, multiplying turbine torque Tt calculated using the revolution rate e of input-output shaft of the torque converter and the torque converter characteristics explained in FIG. 7, or the turbine torque Tt obtained from the torque sensor mounted on the torque converter output shaft, with torque transfer ratio td in which the torque transfer condition changes from low-geared to high-geared at the time of clutch shift, allows estimation of the transmission output shaft torque Tou for gear upshifting.

In FIG. 15, multiplying the changing revolution rate Noa obtained from the revolution No of transmission output shaft, with torque translation constant K4 for translating acceleration of the vehicle to torque, allows estimation of the transmission output shaft torque Tod in gear downshifting. By applying this estimation of transmission output shaft torque during shifting, significant suppression of gear change shock may be achieved.

The compensatory control of driving shaft torque during shifting as described above is ignition timing control. Otherwise, a system with better exhaust performance may be realized by using air-flow control by electronic controlled throttle, or connecting pressure control of clutches.

Figure 16:
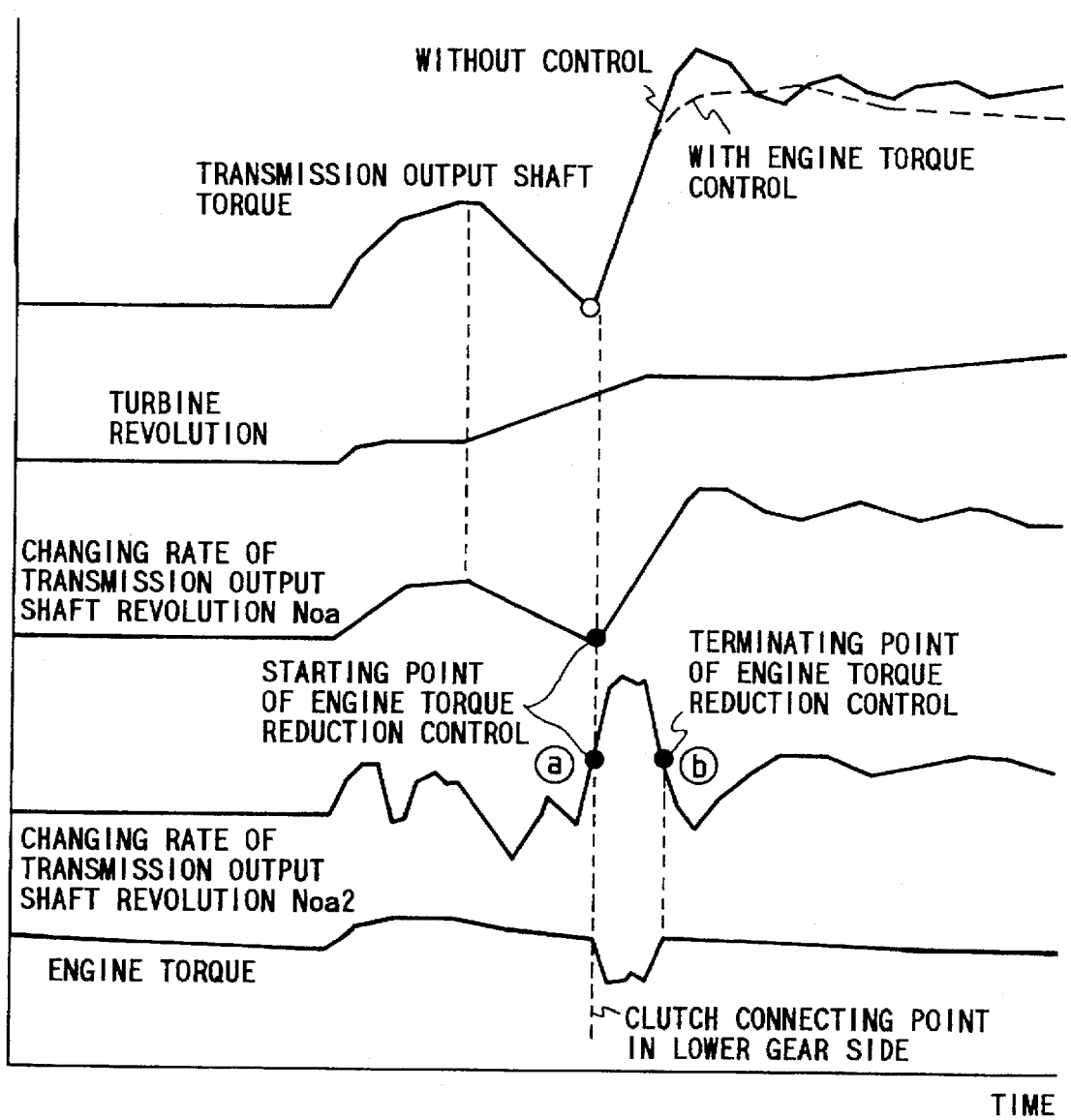
FIG. 16 is a time-based chart of shock suppressing control for gear downshifting.

FIG. 16 shows a time-based chart of shock suppressing control for gear downshifting. The changing revolution rate of the transmission output shaft Noa mentioned above approximately correlates to the transmission output shaft torque. This is found in the case in which there is no torque change between tires and transmission output shaft, i.e., shaft vibration. In that case, signal carrying Noa approximately correlates to a signal from an acceleration sensor mounted on the vehicle body. Thus the moment of clutch connection may be recognized in a manner shown in FIG. 6. On the other hand, the case in which the torque changes between tires and transmission output shaft, i.e., where shaft vibration happens, is shown as the changing revolutions rate of transmission output shaft Noa2. This signal may be generated in the case where there is a long axle, better tires and transmission, such as rear wheel drive as shown in FIG. 16. If the clutch connection timing is detected by this Noa2 signal, it is needed to recognize the abrupt rising point (shown as black dot (a)). By decreasing engine torque at this timing, shock of gear downshifting may be suppressed as shown by broken line. In addition, for controlling decreased engine torque by, for example, retarded ignition timing, the waveform of Noa2 signal may be used to trace the change in Noa2 signal. This eliminates a table storing the amount of decreased engine torque and duration so that the capacity of ROM (Read Only Memory) may be reduced.

Figure 17:
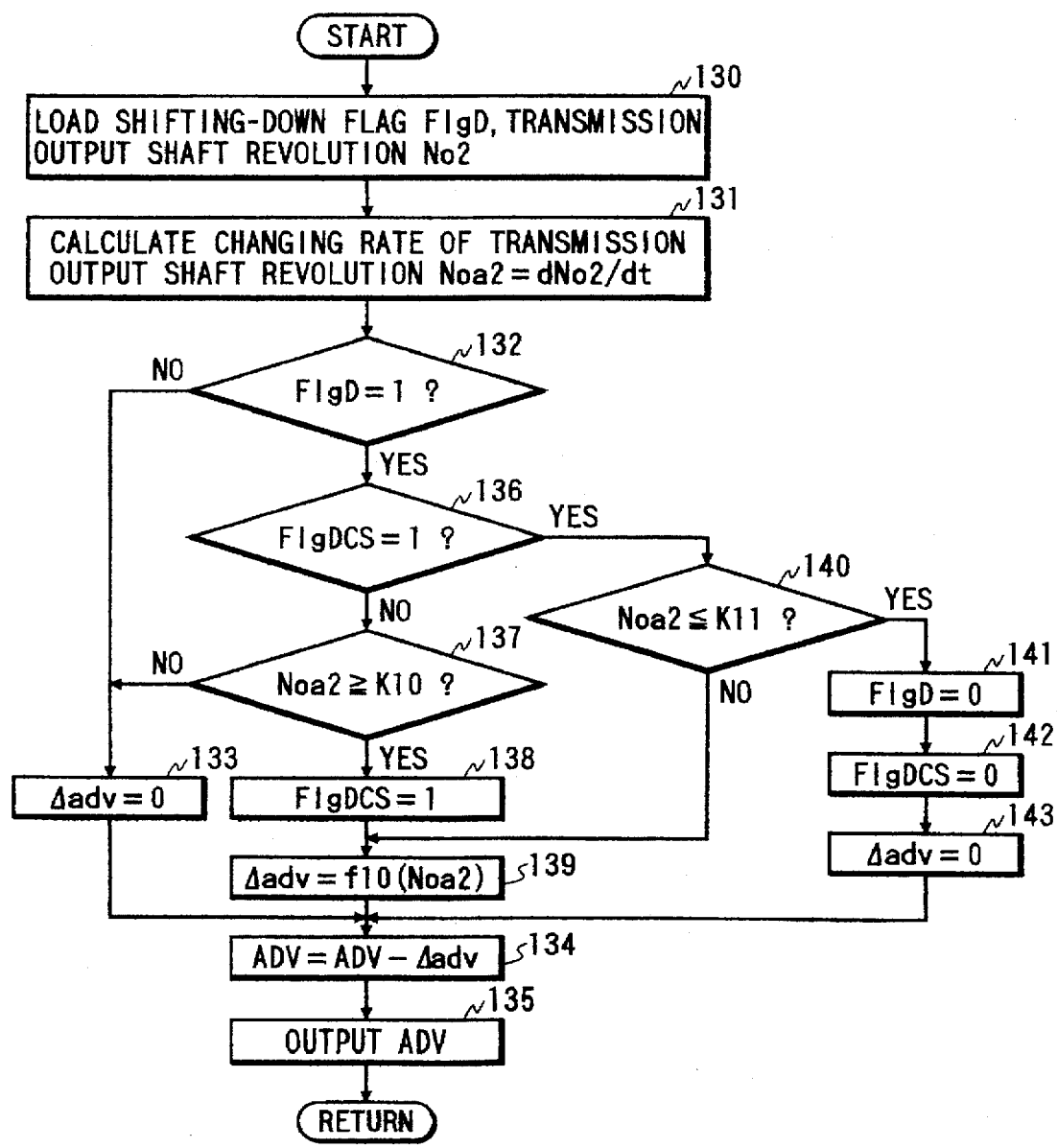
FIG. 17 is a flow chart of the shock suppressing control.

FIG. 17 shows a flow chart of the shock suppressing control by using Noa2 shown in FIG. 16. In step 130, shift down start flag FlgD and the revolutions of transmission output shaft No2 in the case of shaft vibration are loaded as signals determined in the gear shift control. In step 131, the changing rate Noa2 of the No2 is calculated. In step 312, it is determined whether or not FlgD is 1, that is, whether shift down signal has been generated. If no, then the process will proceed to step 133 to enter 0 in the compensated ignition timing Δadv to proceed to step 134. Then after subtracting the retarding amount Δadv from the actual reference ignition timing ADV, the process proceeds to output in step 135. If yes in step 132, then the process will proceed to step 136, where it is determined whether or not flag of decreased engine torque control for gear downshifting FlgDCS is 1. If no, then the process will proceed to step 137 to determine if Noa2 is greater than decreased engine torque control starting constant k10 for gear downshifting. If no, then the process will proceed to step 133. If yes then the process will proceed to step 138 to enter 1 into the FlgDCS. After Δadv is determined from function f10 of Noa2 in step 139, the process will proceed to step 134. This timing determined is the point (a) of FIG. 16. If FlgDCS is 1 in step 136, then the process will proceed to step 140, where it is determined whether or not Noa2 is less than decreased engine torque control terminating constant k11 for gear downshifting, i.e., whether engine torque decreasing is in progress. If no, that is, engine torque is decreasing, the process will proceed to step 136. If yes, that is control is terminated, then the process will proceed to step 141, 142, 143 to enter 0 respectively in FlqD, FlqDCS and Δadv to proceed to step 134. By doing this, shock suppressing control during gear downshifting may be realized with accuracy and without additional cost.

Figure 18:
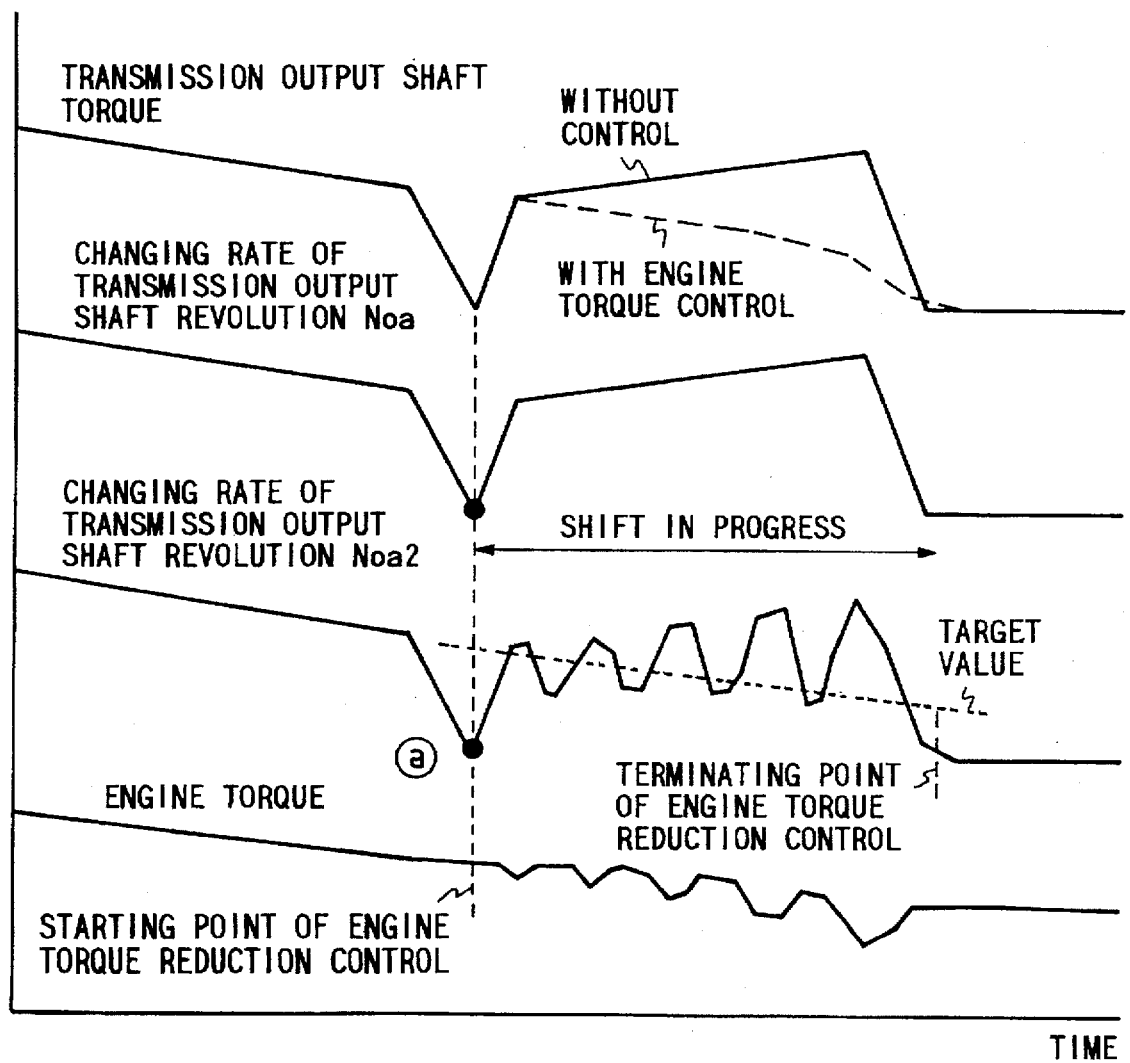
FIG. 18 is a time-based chart of shock suppressing control during gear upshifting.

FIG. 18 shows a time-based chart of shock suppressing control during gear upshifting. The waveform of Noa and Noa2 when upshifting is similar to FIG. 16. Noa may form a similar waveform to the transmission output shaft, while Noa2 shows large vibration as shown in FIG. 18 during gear shift. The clutch connecting timing for shifting to higher gear may be recognized almost accurately from the falling Noa2, with some delay. The engine torque decreasing control may be started from this moment (point (a) in FIG. 18). The value of control target at this time may be determined by using Noa2 at the moment of occurring shift up signal (FlgU). Then the difference between the target value and the actual Noa2 is used for controlling engine torque to suppress torque shocks. By this, a torque characteristics as shown by broken line may be obtained.

Figure 19:
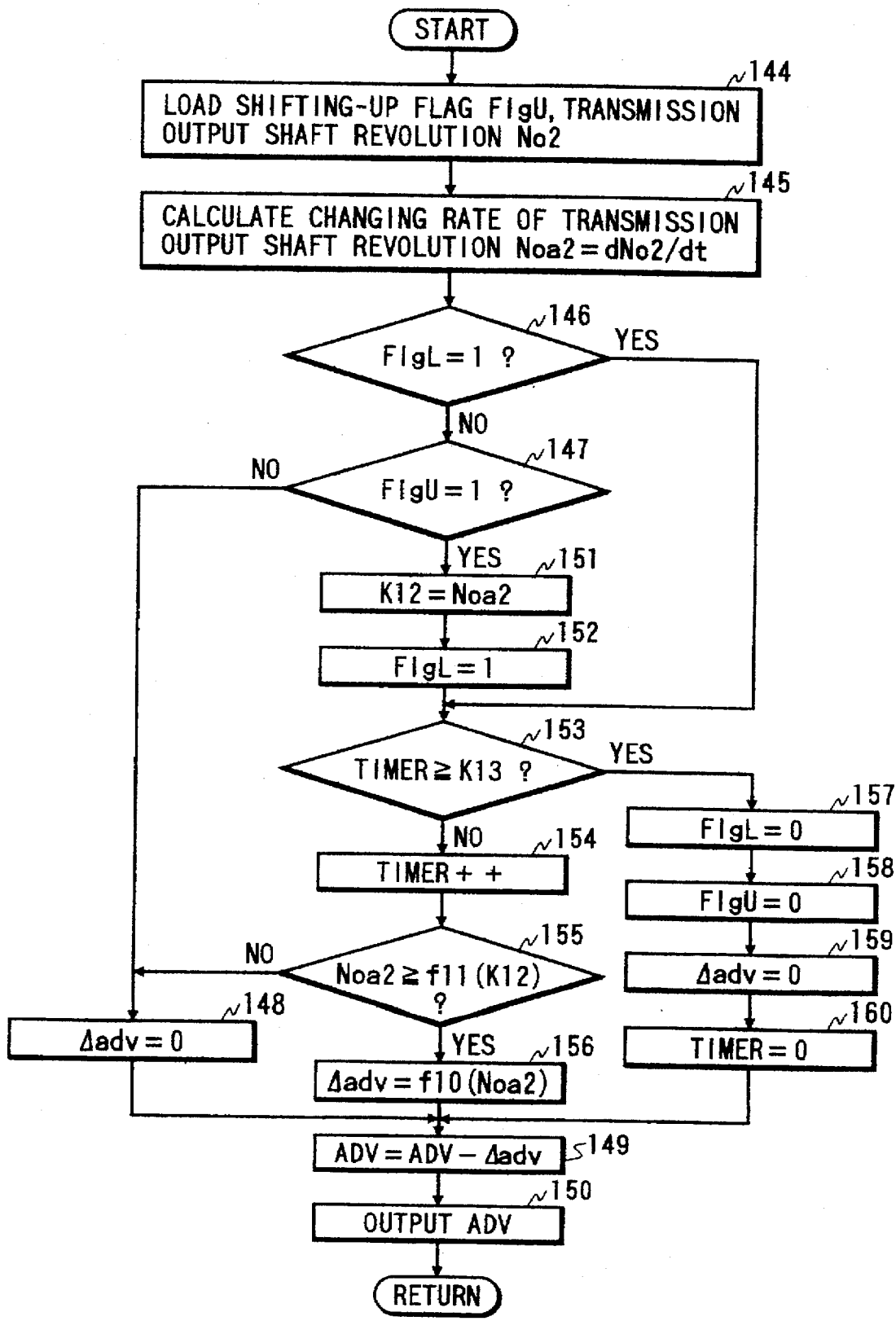
FIG. 19 is a flow chart of shock suppressing control.

FIG. 19 shows a flow chart of shock suppressing control by using Noa2 in FIG. 18. In step 144, shift up start flag FlgU and the revolution of transmission output shaft No2 in the case of shaft vibration are loaded as signals determined in the gear shift control. In step 145, the changing rate Noa2 of the No2 is calculated. In step 146, it is determined whether or not FlgL, a flag for preventing process for latching Noa2 signal when the upshifting start signal is generated, is 1. If no, then the process will proceed to step 147 to determine whether or not FlgU is 1, that is, the shifting up signal has been generated. If no, then the process will proceed to step 148 to enter 0 in the compensated ignition timing Δadv to proceed to step 149. Then after subtracting the retarding amount Δadv from the actual reference ignition timing ADV, the process proceeds to output in step 150. If yes in step 147, then the process will proceed to step 151, where the value of Noa2 is input to k12 to be latched. Then 1 is entered to said FlgL in step 152. In step 153, it is determined whether or not a timer for deciding the time of the termination of the engine torque decreasing control is greater than a termination time constant k13. If no, then the process will proceed to step 154 to increment the timer. Then the process will proceed to step 155 to determine whether or not Noa2 is greater than the target value of engine torque control determined from function f11 of the target value setting constant k12. Here, only engine torque decreasing control is shown because the engine torque control uses ignition timing retard. For example, inthe case that throttle valve controlling system is implemented, control of increasing and decreasing engine torque may be realized. If no in step 155 then the process will proceed to step 148. If yes then the process will proceed to step 156 to determine Δadv from function f10 of Noa2 to proceed to step 149. This timing determined is the point (a) of FIG. 18. If the timer is over k13 in step 153, then engine torque control of gear upshifting is determined to be terminated, and the process will proceed to step 157, 158, 159, and 160 to enter 0 in FlgL, FlgU, Δadv and timer respectively, to proceed to step 149. By doing this, shock suppressing control during gear upshifting may be realized with accuracy and without additional cost.

The present invention may detect accurately the moment in which driving shaft torque is most controllable, i.e., the clutch shifting timing so that shocks of gear change may sufficiently be suppressed. Also, as the starting timing of the compensatory control of torque matches with detecting apparatus for detecting clutch shifting, experimental matching for each shift is not required and experimental labor may be eliminated.

What is claimed is:

1. Apparatus for controlling automatic transmission of a motor vehicle having an engine and an automatic transmission including a clutch for changing gear ratio, comprising:

detecting means for detecting output shaft revolutions of said automatic transmission;

means for calculating a rate of revolution change from the detected revolutions; and means for controlling an output shaft torque of said automatic transmission by using the calculated rate of revolution change.

2. Apparatus for controlling automatic transmission according to claim 1, further comprising:

means for estimating a clutch connecting point in accordance with the calculated rate of revolution change.

3. Apparatus for controlling automatic transmission according to claim 2, wherein said detecting means for detecting the output shaft revolutions is an acceleration sensor.

4. Apparatus for controlling automatic transmission according to claim 2, wherein said estimating means determines an amount of ignition timing correction using said rate of revolution change.

5. Method for controlling automatic transmission for a motor vehicle having an engine and an automatic transmission including a clutch for changing gear ratio, comprising the steps of:

detecting revolutions of an output shaft of said automatic transmission;

calculating a rate of revolution change from the detected revolution; and controlling an output shaft torque of said automatic transmission using the calculated rate of revolution change.

6. Method for controlling automatic transmission according to claim 5, further comprising the step of:

estimating a clutch connecting point in accordance with the calculated rate of revolution change.

7. Method for controlling automatic transmission according to claim 6, wherein an acceleration sensor detects the revolutions in said step of detecting the revolutions of the output shaft of said automatic transmission.

8. Method for controlling automatic transmission according to claim 6, wherein said step of estimating the connection of said clutch uses said rate of revolution change.

9. Apparatus for controlling automatic transmission for a motor vehicle having an engine and an automatic transmission including a torque converter, a stepped automatic transmission mechanism connected to an output shaft of said torque converter, a driving shaft connected with said stepped automatic transmission mechanism, and a hydraulic circuit for activating said stepped automatic transmission, comprising:

means arranged after the stepped automatic transmission mechanism for detecting start timing of controlling a driving shaft torque of said driving shaft at the moment of downshifting; and means for executing controlling said driving shaft torque triggered by the signal from said detecting means.

10. Apparatus for controlling automatic transmission for a motor vehicle having an engine and an automatic transmission including a torque converter, a stepped automatic transmission mechanism connected to an output shaft of said torque converter, a driving shaft connected with the automatic transmission mechanism, and a hydraulic circuit for activating said stepped automatic transmission mechanism during gear-shifting, comprising:

first detecting means located before the automatic transmission mechanism for detecting a first timing when an output torque of said torque converter is transferred from a first clutch before gear-shifting to a second clutch after gear-shifting at the moment of gear-upshifting;

second detecting means located after the automatic transmission mechanism for detecting a second timing when an output torque of said torque converter is transferred from a third clutch before gear-shifting to a fourth clutch after gear-shifting at the moment of gear-downshifting; and means for controlling a present driving shaft torque of said driving shaft in response to said first timing or said second timing.

11. Apparatus for controlling automatic transmission according to claim 10, wherein said first detecting means detects a rate of revolution change of the engine or of the output shaft of said torque converter, and said second detecting means detects a rate of revolution change of said driving shaft of the automatic transmission.

12. Apparatus for controlling automatic transmission according to claim 10, wherein said first detecting means is a torque sensor mounted onto an output shaft of the engine or the output shaft of the torque converter, and said second detecting means is a torque sensor mounted onto the driving shaft of the automatic transmission.

13. Apparatus for controlling automatic transmission according to claim 10, wherein means for controlling driving shaft torque is at least one of an engine torque control means for controlling at least one of an amount of fuel, an ignition timing, and an amount of suction air and a control means for a connecting pressure of the clutches in the automatic transmission mechanism.

14. Apparatus for controlling automatic transmission according to claim 10, further comprising:

memory means for storing signals of said first timing detected by said first detecting means and said second timing detected by said second detecting means;

deciding means for deciding a timing of change of connecting and disconnecting the clutches at gear-shifting based on a result of comparing values of said stored signals in said memory means with present values of said signals of said first timing and said second timing before which are stored in said memory means; and signal outputting means for outputting a start signal to control the driving shaft torque based on a judgement of said deciding means.

15. Apparatus for controlling automatic transmission according to claim 14, further comprising:

rough road ascertaining means for ascertaining running condition in which the signal of the second timing detected by the second detecting means varies; and torque controlling means for rough road for changing controlling value of said driving shaft torque for running condition on rough road from normal running condition based on a judgement of said rough road ascertaining means.

16. Apparatus for controlling automatic transmission according to claim 10, wherein said means for controlling the driving shaft torque comprises a timer for counting time during gear-shifting and controlling the driving shaft torque to a predetermined value, calculating means for calculating a target torque of the driving shaft torque in response to said first timing or said second timing, and torque feedback controlling means for executing control of the driving shaft torque after a termination of the counting time by the timer in accordance with a deviation between the target torque to control the driving shaft torque and the present driving shaft torque detected or calculated.

17. Apparatus for controlling automatic transmission according to claim 16, wherein at least one timing of gear-shifting changes is based on values of said target torque and gear-shifting type.

18. Apparatus for controlling automatic transmission according to claim 16, wherein said present driving shaft torque is derived using a torque reduction coefficient for converting torque from a rate of revolution change of the drive shaft at the moment of gear-downshifting and vehicle acceleration.

19. Apparatus for controlling automatic transmission according to claim 10, further comprising:

deviation calculating means for calculating deviation of the driving shaft torque between the target torque and the presently detected or calculated torque;

deviation detecting means for detecting when the deviation of the driving shaft torque is less than a predetermined value and outputting a signal at that time;

a timer for counting and outputting a signal of a predetermined time period after the signal output from the deviation detecting means; and termination deciding means for deciding a termination timing of controlling the drive shaft torque and outputting a signal of the termination timing in accordance with the signal output from the timer.

* * * * *